US012779815B2

(12) United States Patent
McCollam et al.

(10) Patent No.: US 12,779,815 B2
(45) Date of Patent: Nov. 3, 2026

(54) BONDED ARTICLES

(71) Applicant: Donaldson Company, Inc., Bloomington, MN (US)

(72) Inventors: Robert P. McCollam, Vadnais Heights, MN (US); Daniel J. Bakke, Minneapolis, MN (US)

(73) Assignee: Donaldson Company, Inc., Bloomington, MN (US)

( * ) Notice: Subject to any disclaimer, the term of this patent is extended or adjusted under 35 U.S.C. 154(b) by 179 days.

(21) Appl. No.: 18/582,077

(22) Filed: Feb. 20, 2024

(65) Prior Publication Data

US 2024/0278532 A1 Aug. 22, 2024

Related U.S. Application Data

(60) Provisional application No. 63/451,196, filed on Mar. 9, 2023, provisional application No. 63/447,236, filed on Feb. 21, 2023.

(51) Int. Cl.
*B32B 5/26* (2006.01)
*B01D 39/16* (2006.01)
(Continued)

(52) U.S. Cl.
CPC ............ *B32B 5/266* (2021.05); *B01D 39/163* (2013.01); *B32B 5/022* (2013.01); *B32B 37/06* (2013.01); *B32B 37/10* (2013.01); *B01D 2239/0618* (2013.01); *B01D 2239/065* (2013.01); *B01D 2239/10* (2013.01); *B32B 2250/20* (2013.01); *B32B 2262/0253* (2013.01);
(Continued)

(58) Field of Classification Search
CPC ......... B32B 5/266; B32B 5/022; B32B 37/06; B32B 37/10; B32B 2250/20; B32B 2262/0253; B32B 2305/18; B32B 2307/538; B32B 2307/724; B32B 2309/12; B32B 2327/18; B01D 39/163; B01D 2239/0618; B01D 2239/065; B01D 2239/10; B29C 66/71; B29K 2027/18
See application file for complete search history.

(56) References Cited

U.S. PATENT DOCUMENTS

| | | | |
|---|---|---|---|
| 2,396,629 | A | 3/1946 | Johannes et al. |
| 2,782,180 | A | 2/1957 | Wesley |
| 2,961,712 | A | 11/1960 | Davis |
| 3,082,292 | A | 3/1963 | Gore |
| 3,953,566 | A | 4/1976 | Gore |
| 4,096,227 | A | 6/1978 | Gore |
| 4,153,661 | A | 5/1979 | Ree et al. |

(Continued)

FOREIGN PATENT DOCUMENTS

| | | | |
|---|---|---|---|
| EP | 0731153 | A1 | 9/1996 |
| EP | 0955211 | A2 | 11/1999 |

(Continued)

OTHER PUBLICATIONS

[NPL-1] Knox (FR 2694940 A1); Feb. 25, 1994 (European Patent Office machine translation to English). (Year: 1994).*

(Continued)

*Primary Examiner* — Donald M Flores, Jr.
(74) *Attorney, Agent, or Firm* — Mueting Raasch Group

(57) ABSTRACT

Articles are disclosed, and methods and apparatuses for making the same, the articles having two or more bonded layers, such as polymer layers. The two or more layers are bonded together by pressing the two or more layers between a first pressing surface and a second pressing surface to a pressure of at least 10,000 psi.

16 Claims, 5 Drawing Sheets

(51) Int. Cl.
*B32B 5/02* (2006.01)
*B32B 37/06* (2006.01)
*B32B 37/10* (2006.01)

(52) U.S. Cl.
CPC ..... *B32B 2305/18* (2013.01); *B32B 2307/538* (2013.01); *B32B 2307/724* (2013.01); *B32B 2309/12* (2013.01); *B32B 2327/18* (2013.01)

(56) References Cited

U.S. PATENT DOCUMENTS

| | | | | |
|---|---|---|---|---|
| 4,187,390 A * | 2/1980 | Gore | B32B 5/32 428/323 |
| 4,252,760 A | 2/1981 | Foster et al. | |
| 4,820,787 A | 4/1989 | Kataoka et al. | |
| 4,902,423 A | 2/1990 | Bacino | |
| 4,937,025 A | 6/1990 | Foster et al. | |
| 4,961,891 A | 10/1990 | Pitolaj | |
| 5,374,473 A | 12/1994 | Knox et al. | |
| 5,399,307 A | 3/1995 | Dalton et al. | |
| 5,433,909 A | 7/1995 | Martakos et al. | |
| 5,626,561 A | 5/1997 | Butler et al. | |
| 5,792,525 A | 8/1998 | Fuhr et al. | |
| 5,861,033 A | 1/1999 | Martakos et al. | |
| 5,955,016 A | 9/1999 | Goldfarb | |
| 7,087,136 B2 | 8/2006 | Tippett | |
| 7,179,525 B2 | 2/2007 | Dove | |
| 7,306,729 B2 | 12/2007 | Bacino et al. | |
| 7,306,841 B2 | 12/2007 | Ruefer et al. | |
| 8,293,061 B2 | 10/2012 | Devoe et al. | |
| 8,757,395 B2 | 6/2014 | Bacino et al. | |
| 8,858,681 B2 | 10/2014 | Harp | |
| 10,213,960 B2 | 2/2019 | Padhye et al. | |
| 10,703,048 B2 | 7/2020 | Padhye et al. | |
| 2004/0084304 A1 | 5/2004 | Thompson | |
| 2009/0319034 A1 | 12/2009 | Sowinski | |
| 2010/0068431 A1 | 3/2010 | Bansal et al. | |
| 2010/0068484 A1 * | 3/2010 | Kaufman | C08K 3/01 156/244.11 |
| 2011/0189472 A1 | 8/2011 | Roberts | |
| 2012/0271265 A1 * | 10/2012 | Langdon | B32B 3/10 604/385.16 |
| 2015/0245911 A1 * | 9/2015 | Yang | A61F 2/2846 623/23.5 |
| 2018/0050528 A1 | 2/2018 | Jing | |
| 2019/0134916 A1 | 5/2019 | Padhye et al. | |
| 2022/0001602 A1 | 1/2022 | Cully et al. | |

FOREIGN PATENT DOCUMENTS

| | | | | |
|---|---|---|---|---|
| EP | 0817724 B1 | 3/2000 | |
| EP | 1125731 A1 | 8/2001 | |
| EP | 1641865 B1 | 3/2010 | |
| EP | 2152395 B1 | 6/2016 | |
| FR | 2694940 A1 * | 2/1994 | B29C 66/1122 |
| GB | 2461619 A | 1/2010 | |
| JP | H0694186 B2 | 11/1994 | |
| JP | 3870299 B2 | 1/2007 | |
| KR | 102242547 B1 | 4/2021 | |
| WO | WO-9318214 A1 * | 9/1993 | B01D 69/1212 |
| WO | 9413469 A1 | 6/1994 | |
| WO | 9630208 A1 | 10/1996 | |
| WO | 2008133869 A2 | 11/2008 | |
| WO | 2019068059 A1 | 4/2019 | |

OTHER PUBLICATIONS

3M: "A New Dimension of Opportunity", 3M Science Applied to Life, 3D Printing with 3M™ Dyneon™ Fluoropolymers, 2018, 8 Pages.

American Seal and Packing: "EPTFE Gaskets, Expanded PTFE", 2022, pp. 1-6.

An et al., "Design and 3D Printing of Scaffolds and Tissues", Jun. 2015, Engineering, 1(2):261-268.

Boiko et al., "Bonding at Symmetric Polymer/Polymer Interfaces below the Glass Transition Temperature", 1997, Macromolecules, 30(12):3708-3710.

Campanelli et al., "Processing of High Performance Fluoropolymers by Laser Sintering", 2018, Proceedings of the 29th Annual International Solid Freeform Fabrication Symposium—An Additive Manufacturing Conference, pp. 1592-1609.

Cardell., "Study of Polymeric Film Bonding for Pharmaceutical Applications", Jun. 2011, Massachusetts Institute of Technology, 29 Pages.

Chandrasekaran C., "Isostatic Molding", Anticorrosive Rubber Lining, 2017, Retrieved on Aug. 22, 2022, pp. 1-36.

Chivukula, "The Effect of Process Parameters and Surface Condition on Bond Strength between Additively Manufactured Components and Polymer Substrates", Dec. 2016, Graduate Theses and Dissertations, 83 pages.

Cho, "Consolidation and Self-bonding in Poly(Ether Ether Ketone)[PEEK]", May 1994, Washington University, 24 Pages.

Cuminatto et al., "A Model for Patterned Interfaces Debonding—Application to Adhesion Tests", 2015, International Journal of Solids and Structures, 75-76:122-133.

Ebnesajjad S., "Expanded Polytetrafluoroethylene," Expanded PTFE Applications Handbook, 2017, Retrieved on Aug. 22, 2022, pp. 1-24.

Epson: "LQ-2090II N Network Impact Dot Matrix Printer", 2022, pp. 1-6.

"Impact Printers", Sep. 7, 2022, Microplex Printware, pp. 1-7.

International Search Report and Written Opinion for International Application No. PCT/US2024/016508, mailed Jun. 17, 2024, 10 Pages.

Jordan et al., "Compressive Properties of Extruded Polytetrafluoroethylene", 2007, Polymer, 48(14): 4184-4195.

Khosroshahi et al., "Experimental Study and Modeling of Polytetrafluoroethylene (PTFE) and Hydroxyapatite Biocomposite Surface Treatment Using Selective Laser Sintering", 2015, AASCIT Journal of Materials, 1(4): 75-82.

Kim, "Layer Bonding of Solvent-Cast Thin Films for Pharmaceutical Solid Dosage Forms", Sep. 2010, Massachusetts Institute of Technology, 1-84.

"Low Surface Energy Materials: Measurements and How to Optimize Interface for Bonding", Jul. 20, 2021, Coolmag, 1-83.

Lupone et al., "Process Phenomena and Material Properties in Selective Laser Sintering of Polymers: A Review", 2022, Materials, 15(183): 1-37.

Manas et al., "Effect of Beta Radiation on the Quality of the Bonded Joint for Difficult to Bond Polyolefins", Nov. 12, 2019, Polymers, 11(11):1-22.

Moynihan., "The Molecular Structure of Perfluorocarbon Polymers Infrared Studies on Polytetrafluoroethylene", Jan. 13, 1958, Molecular Structure of Perfluorocarbon Polymers, 81:1045-1050.

Nofal et al., "Selective Laser Sintering of Phase Change Materials for Thermal Energy Storage Applications", 2017, Procedia Manufacturing, 10:851-865.

OKI Data: "OKI Data Printers No Longer Available in the US Market", Mar. 19, 2021, Laserline, pp. 1-6.

Oshima et al., "Radiation Induced Crosslinking of Polytetrafluoroethylene", 1995, Japan Atomic Energy Research Institute, pp. 487-491.

Padhye et al., "A New Phenomenon: Sub-Tg, Solid-State, Plasticity-Induced Bonding in Polymers", Apr. 20, 2017, Scientific Reports, 7(46405):1-11.

Padhye et al., "Dilatational-Plasticity Opens a New Mechanistic Pathway for Macromolecular Transport Across Polymeric Interfaces Yielding Solid-State Bonding", May 9, 2022, arXiv:2205.04015v1 [cond-mat.soft], 20 Pages.

Padhye, "Mechanics and Modeling of Cold Rolling of Polymeric Films at Large Strains—A Rate-Independent Approach", Jun. 29, 2022, arXiv:2206.14479v1 [cond-mat.soft], 1-56.

Padhye, "Sub-Tg, Solid-State, Plasticity-Induced Bonding of Polymeric Films and Continuous Forming", Sep. 2015, Massachusetts Institute of Technology, 1-310.

(56) References Cited

OTHER PUBLICATIONS

Pastewka et al., "Contact Between Rough Surfaces and a Criterion for Macroscopic Adhesion", Mar. 4, 2014, PNAS, 111(9):3298-3303.
PFI: "PTFE Compression Molding", Aug. 22, 2022, pp. 1-3.
PFI: "PTFE Thermal Forming", Aug. 22, 2022, pp. 1-3.
"PTFE Compression Molding", Applied Plastics Technology, Inc., Retrieved on Feb. 16, 2023, 2 Pages.
"PTFE Near Net Shapes", Teflon™ PTFE Compression Molded Near Net Shapes, Applied Plastics Technology, Inc., Retrieved on Feb. 16, 2023, 3 Pages.
Rae et al., "The Properties of Poly(Tetrafluoroethylene) (PTFE) in Compression", 2004, Polymer, 45(22):7615-7625.
Santos et al., "Commercial Self-Reinforced Composites: A Comparative Study", Oct. 15, 2021, Composites Part B: Engineering, ScienceDirect, 223(109108):1-9.
Shuai et al., "Nanodiamond Reinforced Polyvinylidene Fluoride/Bioglass Scaffolds for Bone Tissue Engineering", Aug. 24, 2016, Journal of Porous Materials, 24, pp. 1-9.
"Teflon™ PTFE (Polytetrafluoroethylene) / Resin Information Properties", Applied Plastics Technology, Inc., Retrieved on Feb. 16, 2023, 3 Pages.
Thermech Engineering Corporation: "PTFE / Teflon® Compression Molding", 2022, pp. 1-4.
Tsao et al., "Low Temperature Bonding of PMMA and COC Microfluidic Substrates Using UV/ozone Surface Treatment", Mar. 7, 2007, Lab Chip, 7:499-505.
TWI: "What Is Laminated Object Manufacturing (LOM)?", Retrieved on Sep. 14, 2022, pp. 1-8.
Uba et al., "High Process Yield Rates of Thermoplastic Nanofluidic Devices using a Hybrid Thermal Assembly Technique", 2015, Lab on a Chip, 15(4):1-33.
Ward et al., "The Science and Technology of Hot Compaction", 2004, Polymer 45(5):1413-1427.
Wool et al., "Adhesion at Polymer-polymer Interfaces: A Rigidity Percolation Approach", 2006, C. R. Chimie, 9:25-44.
Wool et al., "Welding of Polymer Interfaces", Mid-Oct. 1989, Polymer Engineering and Science, 29 (19):1340-1367.
Zhang et al.,"Fabrication of Functionally Graded Porous Polymer Structures Using Thermal Bonding Lamination Techniques", 2017, Science Direct, 45th SME North American Manufacturing Research Conference, NAMRC 45, LA, USA, 10:866-875.
Guerin et al., "The adhesion of amorphous polystyrene surfaces below Tg", Nov. 2003, Science Direct, 44 (24):7477-7484.

* cited by examiner

BONDED ARTICLES

RELATED APPLICATIONS

This application claims the benefit of U.S. Provisional Patent Application No. 63/451,196, filed on Mar. 9, 2023, titled BONDED ARTICLES and U.S. Provisional Patent Application No. 63/447,236, filed on Feb. 21, 2023, titled BONDED POLYMERIC ARTICLES, each of which is hereby incorporated by reference in its entirety.

TECHNOLOGICAL FIELD

Disclosed herein are methods and apparatuses for bonding layers together by pressing two or more layers together, thereby forming a bond between the two or more layers. Additionally disclosed herein are articles manufactured by such methods and apparatuses.

BACKGROUND

Typical methods of bonding layers together may include using an adhesive between the two layers or using pressure and heat (i.e., sintering) to form a bond between two layers. Methods using pressure and heat to form a bond between two layers may be described as requiring heat to increase the temperature of the layers to above their respective glass transition temperatures, above which temperatures, the polymers transition from a glassy state to a viscous or rubbery state. The viscous or rubbery state of the layers above the glass transition temperature may be described as allowing polymer chains from each of the layers at the boundary to inter-diffuse and interconnect, thereby establishing a bond. Layers bonded together using an adhesive or heat and pressure may have limitations, such as weakened bond strength at high temperatures. Furthermore, adhesive bonding in methods, apparatuses, and articles may be described as introducing additional materials needs, processing needs, and potential failure modes.

SUMMARY

Some embodiments of the technology disclosed herein relate to a method of manufacturing a cellulose article. A first cellulose layer is placed in contact with a second cellulose layer. The first cellulose layer is pressed against the second cellulose layer between a first pressing surface and a second pressing surface to a pressure of at least 10,000 pounds per square inch (psi), thereby forming a bond between the first cellulose layer and the second cellulose layer. The bond is releasable by contact with water.

In some such embodiments the first pressing surface includes a rough surface. Additionally or alternatively, the cellulose article includes a permeable fibrous substrate having a particle filtration efficiency. Additionally or alternatively, a flexible backer layer is placed between the first cellulose layer and the first pressing surface. Additionally or alternatively, the flexible backer layer includes paper. Additionally or alternatively, the flexible backer layer includes sandpaper. Additionally or alternatively, the flexible backer layer has a yield strength less than a yield strength of the first pressing surface. Additionally or alternatively, a compliant layer is placed between the first pressing surface and a press. Additionally or alternatively, the cellulose article includes fractured fibers. Additionally or alternatively, the cellulose article has a rough surface. Additionally or alternatively, the cellulose article includes a three-dimensional bond interface.

Additionally or alternatively, the first cellulose layer and the second cellulose layer are sintered to form a supplemental bond between the first cellulose layer and the second cellulose layer. Additionally or alternatively, the sintering is laser sintering. Additionally or alternatively, the sintering is thermal sintering. Additionally or alternatively, the pressure is 30,000 psi or greater. Additionally or alternatively, the pressure is 45,000 psi or greater. Additionally or alternatively, the pressure is 55,000 psi or greater. Additionally or alternatively, the pressure is 75,000 psi or greater. Additionally or alternatively, the pressure is 100,000 psi or greater. Additionally or alternatively, the first pressing surface has a yield strength of at least the pressure. Additionally or alternatively, the cellulose article has a thickness of less than 15% of a thickness of the first cellulose layer and the second cellulose layer before the pressing.

Some embodiments of the technology disclosed herein relate to a method of manufacturing an article. A first polymer layer is placed in contact with a second layer. The first and second layers are pressed between a first pressing surface and a second pressing surface to a pressure of at least 10,000 psi, thereby forming a bond between the first polymer layer and the second layer. The first pressing surface has a rough surface.

In some such embodiments one or both of the first polymer layer and the second layer includes cellulose. Additionally or alternatively, the article includes a permeable fibrous substrate having a particle filtration efficiency. Additionally or alternatively, the article includes fractured fibers. Additionally or alternatively, one or both of the first polymer layer and the second layer includes polytetrafluoroethylene (PTFE). Additionally or alternatively, one or both of the first polymer layer and the second layer includes expanded PTFE (ePTFE). Additionally or alternatively, one or both of the first polymer layer and the second layer includes a fluoropolymer.

Additionally or alternatively, the article has a porous microstructure. Additionally or alternatively, a flexible backer layer is placed between the first polymer layer and the first pressing surface. Additionally or alternatively, the flexible backer layer includes paper. Additionally or alternatively, the flexible backer layer includes sandpaper. Additionally or alternatively, the flexible backer layer has a yield strength less than a yield strength of the first pressing surface. Additionally or alternatively, a compliant layer is placed between the first pressing surface and a press. Additionally or alternatively, the article includes fractured fibrils or flattened nodes. Additionally or alternatively, the article has a rough surface.

Additionally or alternatively, the article includes a three-dimensional bond interface. Additionally or alternatively, the first polymer layer and the second layer are sintered to form a supplemental bond between the first polymer layer and the second layer. Additionally or alternatively, the sintering is laser sintering. Additionally or alternatively, the sintering is thermal sintering. Additionally or alternatively, the pressure is 30,000 psi or greater. Additionally or alternatively, the pressure is 45,000 psi or greater. Additionally or alternatively, the pressure is 55,000 psi or greater. Additionally or alternatively, the pressure is 75,000 psi or greater. Additionally or alternatively, the pressure is 100,000 psi or greater. Additionally or alternatively, the article has a thickness of less than 15% of a thickness of the first polymer layer and the second layer before the pressing. Additionally or alternatively, the first pressing surface has a yield strength of at least the pressure.

Some embodiments of the technology disclosed herein relate to a method of manufacturing an article. A first polymer layer is placed in contact with a second layer. The first polymer layer is pressed against the second layer between a first pressing surface and a second pressing surface to a pressure of at least 10,000 psi, thereby forming a bond between the first polymer layer and the second layer. The article has a porous microstructure.

In some such embodiments, one or both of the first polymer layer and the second layer includes PTFE. Additionally or alternatively, one or both of the first polymer layer and the second layer includes expanded PTFE. Additionally or alternatively, one or both of the first polymer layer and the second layer includes a fluoropolymer. Additionally or alternatively, the first pressing surface has a rough surface. Additionally or alternatively, a flexible backer layer is placed between the first polymer layer and the first pressing surface. Additionally or alternatively, the flexible backer layer includes paper. Additionally or alternatively, the flexible backer layer includes sandpaper. Additionally or alternatively, the flexible backer layer has a yield strength less than a yield strength of the first pressing surface. Additionally or alternatively, a compliant layer is placed between the first pressing surface and a press. Additionally or alternatively, the article has a rough surface. Additionally or alternatively, the article includes a three-dimensional bond interface.

Additionally or alternatively, the first polymer layer and the second layer are sintered to form a supplemental bond between the first polymer layer and the second layer. Additionally or alternatively, the sintering is laser sintering. Additionally or alternatively, the sintering is thermal sintering. Additionally or alternatively, the pressure is 30,000 psi or greater. Additionally or alternatively, the pressure is 45,000 psi or greater. Additionally or alternatively, the pressure is 55,000 psi or greater. Additionally or alternatively, the pressure is 75,000 psi or greater. Additionally or alternatively, the pressure is 100,000 psi or greater. Additionally or alternatively, the article has a thickness of less than 15% of a thickness of the first polymer layer and the second layer before the pressing. Additionally or alternatively, the first pressing surface has a yield strength of at least the pressure. Additionally or alternatively, the article includes fractured fibrils or flattened nodes.

Some embodiments of the technology disclosed herein relate to a method of manufacturing an article. A first polymer layer is placed in contact with a second layer. A flexible backer layer is placed between the first polymer layer and a first pressing surface. The first and second layers are pressed between the first pressing surface and a second pressing surface to a pressure of at least 10,000 psi, thereby forming a bond between the first polymer layer and the second layer.

In some such embodiments one or both of the first polymer layer and the second layer includes cellulose. Additionally or alternatively, the article includes a permeable fibrous substrate having a particle filtration efficiency. Additionally or alternatively, the article includes fractured fibers. Additionally or alternatively, one or both of the first polymer layer and the second layer includes PTFE. Additionally or alternatively, one or both of the first polymer layer and the second layer includes expanded PTFE. Additionally or alternatively, one or both of the first polymer layer and the second layer includes a fluoropolymer. Additionally or alternatively, the first pressing surface has a rough surface. Additionally or alternatively, the article has a porous microstructure. Additionally or alternatively, a compliant layer is placed between the first pressing surface and a press. Additionally or alternatively, the article includes fractured fibrils or flattened nodes. Additionally or alternatively, the article has a rough surface. Additionally or alternatively, the article includes a three-dimensional bond interface.

Additionally or alternatively, the first polymer layer and the second layer are sintered to form a supplemental bond between the first polymer layer and the second layer. Additionally or alternatively, the sintering is laser sintering. Additionally or alternatively, the sintering is thermal sintering. Additionally or alternatively, the flexible backer layer includes paper. Additionally or alternatively, the flexible backer layer includes sandpaper. Additionally or alternatively, the flexible backer layer has a yield strength less than a yield strength of the first pressing surface. Additionally or alternatively, the pressure is 30,000 psi or greater. Additionally or alternatively, the pressure is 45,000 psi or greater. Additionally or alternatively, the pressure is 55,000 psi or greater. Additionally or alternatively, the pressure is 75,000 psi or greater. Additionally or alternatively, the pressure is 100,000 psi or greater. Additionally or alternatively, the article has a thickness of less than 15% of a thickness of the first polymer layer and the second layer before the pressing. Additionally or alternatively, the first pressing surface has a yield strength of at least the pressure.

Some embodiments of the technology disclosed herein relate to a method of manufacturing an article. A compliant layer is placed between a first pressing surface and a press. A first polymer layer is placed in contact with a second layer. The first polymer layer and the second layer are pressed between the first pressing surface and a second pressing surface to a pressure of at least 10,000 psi, thereby forming a bond between the first polymer layer and the second layer.

In some such embodiments, one or both of the first polymer layer and the second layer includes cellulose. Additionally or alternatively, the article includes a permeable fibrous substrate having a particle filtration efficiency. Additionally or alternatively, the article includes fractured fibers. Additionally or alternatively, one or both of the first polymer layer and the second layer includes PTFE. Additionally or alternatively, one or both of the first polymer layer and the second layer includes expanded PTFE. Additionally or alternatively, one or both of the first polymer layer and the second layer includes a fluoropolymer. Additionally or alternatively, the first pressing surface has a rough surface. Additionally or alternatively, the article has a porous microstructure. Additionally or alternatively, a flexible backer layer is placed between the first polymer layer and the first pressing surface. Additionally or alternatively, the flexible backer layer includes paper. Additionally or alternatively, the flexible backer layer includes sandpaper.

Additionally or alternatively, the flexible backer layer has a yield strength less than a yield strength of the first pressing surface. Additionally or alternatively, the article includes fractured fibrils or flattened nodes. Additionally or alternatively, the article has a rough surface. Additionally or alternatively, the article includes a three-dimensional bond interface. Additionally or alternatively, the first polymer layer and the second layer are sintered to form a supplemental bond between the first polymer layer and the second layer. Additionally or alternatively, the sintering is laser sintering. Additionally or alternatively, the sintering is thermal sintering. Additionally or alternatively, the pressure is 30,000 psi or greater. Additionally or alternatively, the pressure is 45,000 psi or greater. Additionally or alternatively, the pressure is 55,000 psi or greater. Additionally or alternatively, the pressure is 75,000 psi or greater. Additionally or alternatively, the pressure is 100,000 psi or greater. Additionally or alternatively, the article has a thickness of less than 15% of a thickness of the first polymer layer and the second layer before the pressing. Additionally or alternatively, the first pressing surface has a yield strength of at least the pressure.

Some embodiments of the technology disclosed herein relate to a method of manufacturing an article. A first polymer layer is placed in contact with a second layer. The first polymer layer and the second layer are pressed between a first pressing surface and a second pressing surface to a pressure of at least 10,000 psi, thereby forming a bond between the first polymer layer and the second layer. The first polymer layer and the second layer are sintered to form a supplemental bond between the first polymer layer and the second layer.

In some such embodiments the sintering is laser sintering. Additionally or alternatively, the sintering is thermal sintering. Additionally or alternatively, the first polymer layer includes cellulose. Additionally or alternatively, the article includes a permeable fibrous substrate having a particle filtration efficiency. Additionally or alternatively, the article includes fractured fibers. Additionally or alternatively, the first pressing surface has a rough surface. Additionally or alternatively, the article has a porous microstructure. Additionally or alternatively, a flexible backer layer is placed between the first polymer layer and the first pressing surface. Additionally or alternatively, the flexible backer layer includes paper. Additionally or alternatively, the flexible backer layer includes sandpaper. Additionally or alternatively, the flexible backer layer has a yield strength less than a yield strength of the first pressing surface. Additionally or alternatively, a compliant layer is placed between the first pressing surface and a press. Additionally or alternatively, the article includes fractured fibrils or flattened nodes.

Additionally or alternatively, the article has a rough surface. Additionally or alternatively, the article includes a three-dimensional bond interface. Additionally or alternatively, the pressure is 30,000 psi or greater. Additionally or alternatively, the pressure is 45,000 psi or greater. Additionally or alternatively, the pressure is 55,000 psi or greater. Additionally or alternatively, the pressure is 75,000 psi or greater. Additionally or alternatively, the pressure is 100,000 psi or greater. Additionally or alternatively, the article has a thickness of less than 15% of a thickness of the first polymer layer and the second layer before the pressing. Additionally or alternatively, the first pressing surface has a yield strength of at least the pressure.

Some embodiments of the technology disclosed herein relate to an article. The article has a first polymer layer that includes a surface and a porous microstructure. The porous microstructure includes fractured fibrils. A second layer includes a surface adjacent to and bonded to the surface of the first polymer layer.

In some such embodiments one or both of the first polymer layer and the second layer further includes PTFE. Additionally or alternatively, one or both of the first polymer layer and the second layer further includes expanded PTFE. Additionally or alternatively, one or both of the first polymer layer and the second layer includes a fluoropolymer. Additionally or alternatively, the porous microstructure further includes flattened nodes. Additionally or alternatively, the article further has a rough surface. Additionally or alternatively, the article further includes a three-dimensional bond interface.

Some embodiments of the technology disclosed herein relate to an article. The article has a first polymer layer that includes a surface. A second layer includes a surface adjacent to and bonded to the surface of the first polymer layer. The article has a thickness of less than 15% of a thickness of the first polymer layer and the second layer prior to bonding.

In some such embodiments, one or both of the first polymer layer and the second layer further includes PTFE. Additionally or alternatively, one or both of the first polymer layer and the second layer further includes expanded PTFE. Additionally or alternatively, one or both of the first polymer layer and the second layer further includes a fluoropolymer. Additionally or alternatively, the first polymer layer further includes fractured fibrils. Additionally or alternatively, the article further has a rough surface. Additionally or alternatively, the article further includes a three-dimensional bond interface.

Some embodiments of the technology disclosed herein relate to an article. The article has a first polymer layer that includes a first surface and a second surface. The first surface has a rough surface. A second layer includes a surface adjacent to and bonded to the second surface of the first polymer layer.

In some such embodiments, the first polymer layer further includes cellulose. Additionally or alternatively, the article further includes a permeable fibrous substrate having a particle filtration efficiency. Additionally or alternatively, the article further includes fractured fibers. Additionally or alternatively, the article further has a porous microstructure. Additionally or alternatively, the article further includes fractured fibrils or flattened nodes. Additionally or alternatively, the article further includes a three-dimensional bond interface.

The above summary is not intended to describe each embodiment or every implementation. Rather, a more complete understanding of illustrative embodiments will become apparent and appreciated by reference to the following Detailed Description of Illustrative Embodiments and claims in view of the accompanying figures of the drawing.

BRIEF DESCRIPTION OF THE DRAWINGS

The present technology may be more completely understood and appreciated in consideration of the following detailed description of various embodiments in connection with the accompanying drawings.

Figure 1:
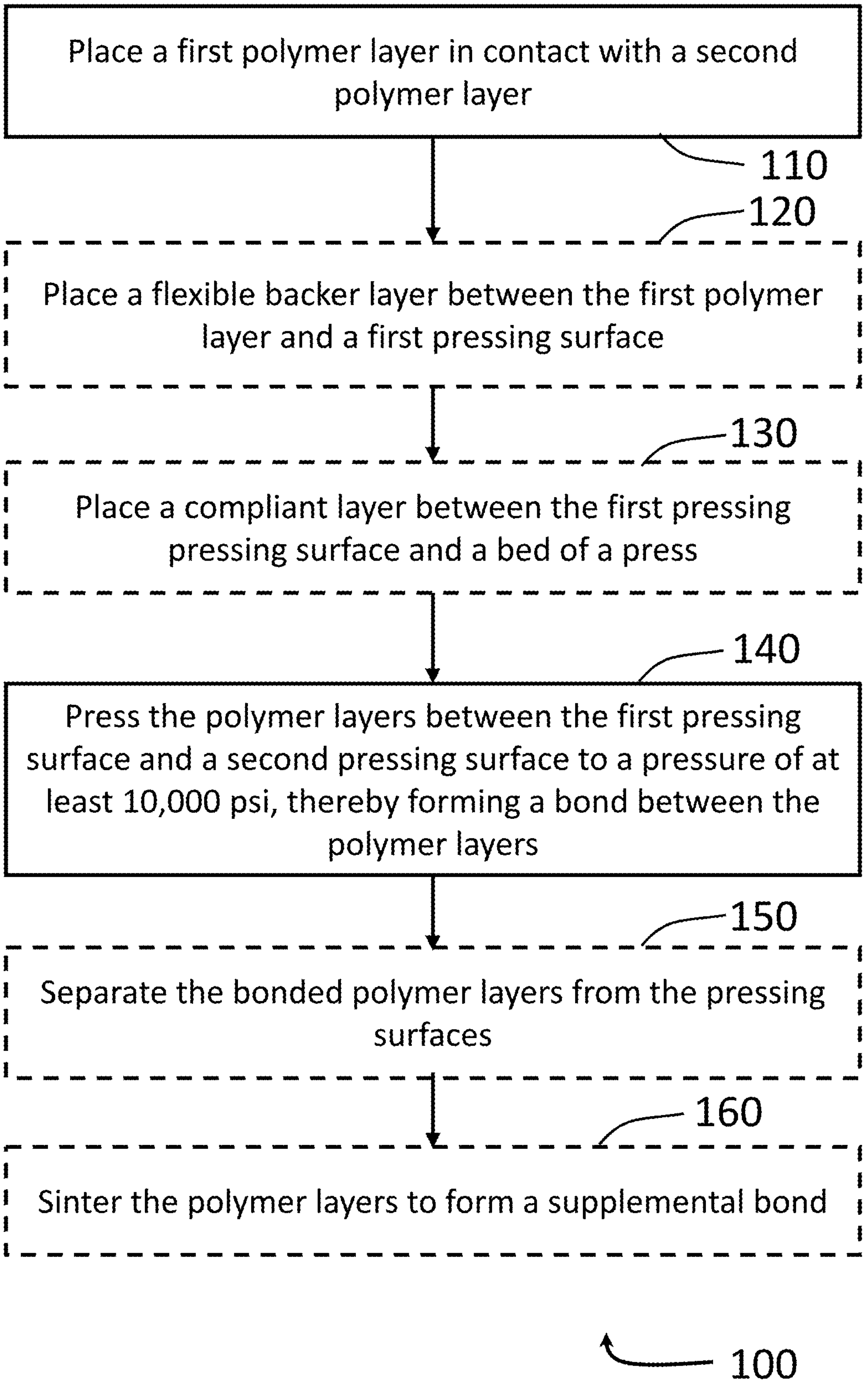
FIG. 1 is a flow diagram showing an illustrative method of making a polymer article according to the present disclosure.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various illustrative embodiments described herein. The lack of illustration/description of such structure/components in a particular figure is, however, not to be interpreted as limiting the scope of the various embodiments in any way.

DETAILED DESCRIPTION

Polymer articles disclosed herein may be produced by bonding two or more layers together using higher than traditional pressures (i.e., compaction) via methods and apparatuses described herein. Such methods and apparatuses may be described as bonding two more layers together without the need for heating the layers (i.e., cold compaction). Put another way, the methods and apparatuses disclosed herein may be used to bond two or more layers directly together (e.g., without an adhesive) at ambient temperature, such as temperatures within the range of 10° C. to 25° C.

Benefits of polymer articles according to the present disclosure may include maintaining functional bond strengths at higher temperatures, as one example. As another example, polymer articles according to the present disclosure may advantageously have relatively improved structural integrity compared to composite materials in the prior art. Such an advantage may eliminate the need for the use of scrim materials. As yet another example, polymer articles according to the present disclosure may advantageously maintain structural integrity at relatively higher temperatures compared to composite materials in the prior art.

Polymer articles and layers subjected to higher than traditional pressures (e.g., greater than 10,000 psi) may be cut by the pressing surfaces, such as at the edge of a pressing surface, which may be undesirable in some implementations. The probability of cutting may be increased, for example, at higher pressures and for thinner layers and thinner polymer articles. Factors affecting the probability of cutting include the thickness and properties of the layers; backing/lining materials between the layers and the pressing surfaces; and shape, texture, and material properties of pressing surfaces. Apparatuses and methods according to the present disclosure may be useful to avoid cutting, for example, by equalizing pressure distribution across the layers.

Example Implementations

Polymer articles disclosed herein may be used in any suitable application. Suitable applications may include breathable vents. Some breathable vents can include breathable rupture vents. Some breathable vents consistent with the technology disclosed herein may advantageously maintain structural integrity at relatively higher temperatures or between relatively larger temperature fluctuations than existing breathable vents. Suitable applications may further include non-breathable rupture vents (e.g., rupture discs). In various implementations, polymer articles consistent with the technology disclosed herein can define filtration media. Such polymer articles are generally permeable to fluid flow. In various examples, such polymer articles exhibit a filtration efficiency.

As another example, polymer articles disclosed herein may be used to form housings, such as for housings of electronics or batteries. Such housings may include integrated vents, such as breathable vents or rupture vents. Polymer articles disclosed herein may further include embossed ePTFE and/or ePTFE composites. Polymer articles consistent with the technology disclosed herein may exhibit improved structural integrity compared to existing materials, which may allow manufacturing operations such as high speed pleating without using supporting structures, such as scrim material, to improve the strength of the material to withstand such operations. Furthermore, embodiments according to the present disclosure may be useful to combine with glass fiber media (e.g., glass fiber mats), for example, to contain glass shed or offer other advantageous filtering properties. Still further, polymer articles may be included in catheters and/or implanted medical devices, for which eliminating the need for adhesives may improve reliability and biostability compared with articles including adhesives.

Methods

A flow diagram illustrating a method 100 of making a polymer article according to the present disclosure is shown in FIG. 1. It is noted that the operations associated with the methods disclosed herein are not particularly limited to the order reflected in FIG. 1. The method 100 includes placing a first polymer layer 110 in contact with a second layer, such as a second polymer layer.

The method 100 may further include placing a flexible backer layer 120 between the first polymer layer and a first pressing surface. The placing a flexible backer layer 120 may further include placing a second flexible backer layer between the second layer and a second pressing surface. In one or more embodiments, the placing a flexible backer layer 120 may be omitted. It is noted that in some embodiments the flexible backer layer is placed in contact with the first pressing surface or in contact with the first polymer layer. In such embodiments, the flexible backer layer is placed between the first polymer layer and the first pressing surface upon positioning of the first polymer layer and the second layer in a receiving position relative to the first pressing surface.

The method 100 may further include placing a compliant layer 130 between the first pressing surface and a bed of a press. The bed of the press may be described as a flat, stationary surface to support a lower working surface (e.g., a bolster) and/or tooling (e.g., a die). The bed may support one of the first or second pressing surfaces, as an example. The placing a compliant layer 130 may further include placing a second compliant layer between the second pressing surface and a ram of the press. The ram of the press may be described as a piston, or plunger, displaced toward or away from the bed during operation of the press. The ram may carry one of the first or second pressing surfaces, as an example. In one or more embodiments, the placing a compliant layer 130 may be omitted. In various embodiments, a compliant layer is placed between the first pressing surface and the bed of a press prior to placing a first polymer layer 110 in contact with a second layer.

The method 100 further includes pressing 140 the layers between the first pressing surface and the second pressing surface to a pressure (hereinafter referred to as "the bonding pressure") of at least 10,000 psi, thereby forming a bond between the layers. Pressing 140 may include, for example, lowering the ram to the sample and lowering the ram to exert pressure on the layers until the exerted pressure reaches a target value. The target value can be chosen based on a relationship between a gauge pressure, a ram force, and a known area of the pressing surface of the pressing tool, as an example.

The bonding pressure (i.e., the peak or target pressure) applied to bond the one or more layers may be any suitable pressure greater than or equal to 10,000 psi. Suitable bonding pressures may include, for example, 10,000 psi or greater, 15,000 psi or greater, 25,000 psi or greater, 30,000 psi or greater, 40,000 psi or greater, 60,000 psi or greater, 75,000 psi or greater, or 100,000 psi or greater. In some embodiments, the bonding pressure may be 55,000 psi or greater, or between 40,000 psi and 60,000 psi.

The method 100 may further include separating 150 the bonded layers from the pressing surfaces. Separating 150 may include holding down the layers while removing (e.g., lifting) the pressing surface to facilitate release without damaging (e.g., tearing) the layers. In some other examples, separating 150 the bonded layers from the pressing surfaces includes pulling the bonded layers out of contact with one or both of the pressing surfaces.

The method 100 may further include sintering 160 the layers to form a supplemental bond therebetween. The sintering 160 can be thermal sintering or laser sintering, as examples. In one or more embodiments, the sintering 160 may be omitted.

In one or more methods, at least one polymer layer may be placed in contact with a surface of a substrate, such as a PTFE sheet, a fiberglass mesh screen, a PTFE-coated fiberglass fabric, or a fiberglass cloth. As described above with respect to bonding the first polymer layer and the second layer, the at least one polymer layer and the substrate may be pressed together to the bonding pressure of at least 10,000 psi, thereby forming a bond between the at least one polymer layer and the substrate.

Example Apparatus

Figure 2:
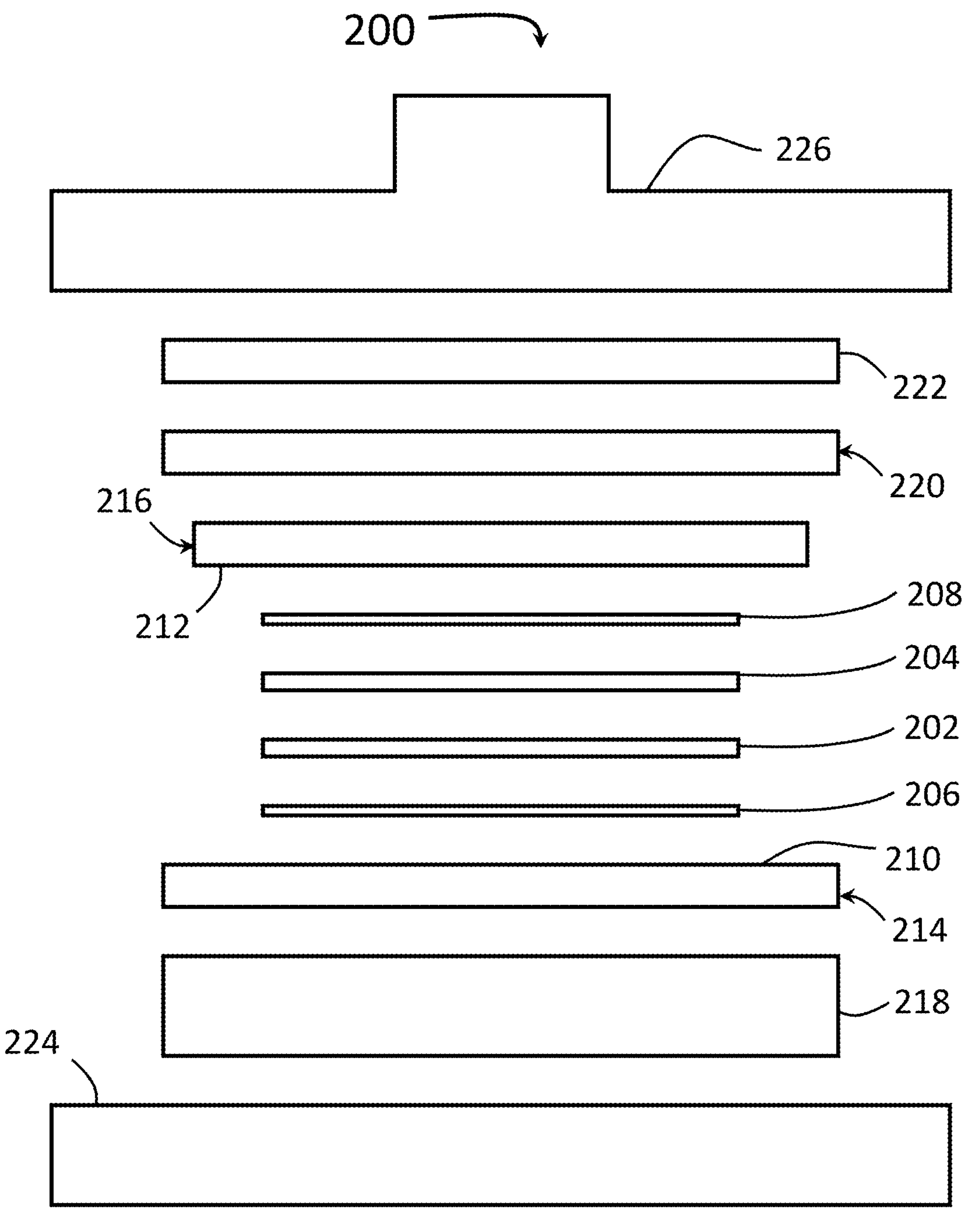
FIG. 2 is an exploded view of an illustrative apparatus for executing the method of FIG. 1.

An exploded view of an illustrative apparatus 200 for executing the method 100 is shown in FIG. 2. The apparatus 200 may be used to form a bond between a first polymer layer 202 and a second layer 204. The first polymer layer 202 and the second layer 204 can be constructed of materials and combinations of materials discussed in more detail below.

It should be noted that, as used in tis specification and the appended claims, reference to numbers of layers is merely for purposes of distinguishing between layers and does not necessarily limit the number of layers.

The first pressing surface 210 and the second pressing surface 212 are generally configured to exert pressure on the layers placed therebetween. Either of the pressing surfaces 210, 212 may be of any suitable material. Suitable pressing surface materials may include steel, for example, hardened (heat treated) 4140 alloy steel, O1 tool steel, M4 tool steel, 17-7 PH stainless steel, 440C stainless steel, or S30V stainless steel. Suitable pressing surface materials may additionally or alternatively include ceramics, for example, machinable aluminum-nitride, high strength and fracture resistant zirconia, or glasses (e.g., borosilicate or quartz glass). Hardened steel, for example, may advantageously resist deformation at the higher than traditional pressures described in the present disclosure. One or both of the pressing surfaces 210, 212 may be, for example, platens of a press, such as a stationary press (e.g., a hydraulic press). One or both of the pressing surfaces 210, 212 may additionally or alternatively be rollers of a rotary press. The first pressing surface 210 may be, for example, the surface of a base plate 214. The first pressing surface 210 may be the surface of a 0.375-inch-thick sheet of alloy steel with a precision surface, polished for a fine texture, as one example. The second pressing surface 212 may be, for example, the surface of a pressing tool 216.

The pressing tool 216 may be the surface of a rectangular 1.181-inch by 0.375-inch gauge block, 0.375 inches tall, with chamfered edges, as an example. As another example, the pressing tool 216 may be the surface of a drill bushing having an outer diameter of 1.5 inches, an inner diameter of 1.25 inches, and chamfered edges. Other suitable pressing tools 216 may include, for example, one or more drill bushings, one or more gauge blocks, a sheet (e.g., a stainless steel sheet) with a pattern (e.g., weave pattern, woven pattern), a sheet (e.g., a stainless steel sheet) with hexagonally-arranged dome shapes on the second pressing surface 212, a woven mesh screen (e.g., a steel mesh screen), captured ball bearings in a hexagonal pattern (e.g., on the second pressing surface 212 of the pressing tool 216), and a porous sintered steel (e.g., a steel disc or a steel sheet) or a combination thereof.

The apparatus 200 may further include a compliant layer 218 between the first pressing surface 210 and a bed 224 of a press. The compliant layer 218 is generally configured to equalize the pressure exerted across the surface area of the layers by the pressing surfaces 210, 212. The compliant layer 218 generally deflects under the bonding pressure to accommodate for any misalignment between the first pressing surface 210 and the second pressing surface 212. That is to say, if the first pressing surface 210 and the second pressing surface 212 are not precisely parallel, deflection of the compliant layer 218 under the bonding pressure applied by the press may accommodate for imperfectly parallel pressing surfaces. The compliant layer may be configured to deflect by up to 0.005 inches, as an example. The compliant layer may be configured to deflect by up to 0.01 inches, up to 0.015 inches, up to 0.02 inches, up to 0.025 inches, or up to 0.03 inches, as further examples.

Additionally or alternatively to the compliant layer 218 between the first pressing surface 210 and the bed 224, the apparatus 200 may include a compliant layer between the second pressing surface 212 and a ram 226 of the press.

The apparatus 200 may further include one or more ram support plates, such as a first plate 220 and/or a second plate 222. The one or more ram support plates are generally configured to equalize the pressure exerted by the ram 226 across the surface area of the pressing tool 216. The first plate 220 can be a steel plate in some embodiments. The first plate 220 can be an alloy steel plate, as an example. In some embodiments, the first plate 220 can have a thickness of 0.375 inches. In some embodiments the second plate 222 can be an aluminum plate. The second plate 222 can have a thickness of 0.25 inches, as an example.

The methods and apparatuses according to the present disclosure may use any suitable press, such as a hydraulic press. The press can be an H-frame press, C-frame press, pneumatic press, toggle press, servo press, punch press, compression molding press, and injection molding press, as examples. The press may be a 60-ton hydraulic H-frame press, as one example. In some embodiments the press can be a rotary press, such as a calendar. Calendaring is a process of smoothing and compressing a material during production by passing a single continuous sheet through a number of pairs of rolls.

The pressing surfaces 210, 212 may have any suitable yield strength. Generally, the pressing surfaces 210, 212 may have yield strengths of greater than the bonding pressure, in order to resist deformation of the pressing surfaces under the bonding pressure. For example, the pressing surfaces may have yield strengths of at least 10% greater than the bonding pressure, at least 20% greater than the bonding pressure, at least 50% greater than the bonding pressure, or at least 100% greater than the bonding pressure. For example, the pressing surfaces may have yield strengths of 10,000 psi or greater, 15,000 psi or greater, 25,000 psi or greater, 30,000 psi or greater, 40,000 psi or greater, 60,000 psi or greater, 75,000 psi or greater, or 100,000 psi or greater. In some embodiments, the pressing surfaces may have yield strengths of 55,000 psi or greater.

In embodiments described herein, flatness and alignment of the pressing surfaces 210, 212 may impact the quality of the bond between the layers 202, 204 and the structure of the resulting article. Precise alignment of pressing surfaces 210, 212 may be accomplished, for example, with a precision die set with parallel guided surfaces (e.g., a precision die set with a flat, precision bottom plate and rods to guide the flat, precision top plate in parallel). Additionally or alternatively, as described herein, the compliant layer 218 (e.g., an ultra-high molecular weight (UHMW) plastic sheet) between one or both of the pressing surfaces 210, 212 and the ram 226 and/or the bed 224 of the press may be used to accommodate misalignment, such as minor misalignments not managed by the precision die set with parallel guided surfaces.

The bonding pressure may be held for any suitable duration. Suitable durations may include, for example, 0.01 seconds or greater and 100 seconds or less. In one example, suitable durations may be 80 seconds or less. In another example, suitable durations may be 60 seconds or less. In another example, suitable durations may be 50 seconds or less. In another example, suitable durations may be 30 seconds or less. In another example, suitable durations may be 10 seconds or less. In another example, suitable durations may be 0.5 seconds or greater and 5 seconds or less. In various examples, the length of time that the bonding pressure is applied does not particularly impact the strength of the bond or the operational parameters of the resulting article.

Layers

The first polymer layer is generally constructed of polymeric materials, meaning that the first polymer layer contains a polymeric material. The first polymer layer can contain polymeric material by mass of 1% or greater, 10% or greater, 20% or greater, or 30% or greater. In some embodiments, the first polymer layer is 50% or greater polymeric material by mass. In some embodiments, the first polymer layer is 100% polymeric material by mass. In some embodiments, the first polymer layer is between 30% and 60% polymeric material by mass.

The second layer can be constructed of a variety of types of materials and combinations of materials. In some embodiments, the second layer is constructed of polymeric materials, but in some other embodiments the second layer is not constructed of polymeric materials. The second layer can be a permeable material, but in some other embodiments, the second layer is non-permeable. In some embodiments where the second layer is a permeable material, the second layer can be a glass filtration media. In one particular example, the second layer is constructed of glass fibers woven into a mesh-like screen. The second layer can be a fibrous glass substrate, meaning that the substrate is composed of at least 50% glass fibers by mass. In some embodiments the second layer can include polymeric materials and non-polymeric materials, such as glass fibers and a non-fibrous polymeric binder material, or glass fibers and polymeric binder fibers. In some embodiments where the second layer is a filter media, the second layer can incorporate a mix of different types of fibrous material such as a mix of glass, cellulose and polymeric fibers.

Figure 3A:
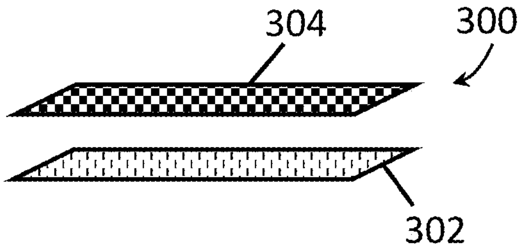
FIGS. 3A-3D are exploded perspective views of illustrative configurations of two or more layers for use in the method of FIG. 1 or the apparatus of FIG. 2.

Exploded perspective views of illustrative configurations of the two or more layers (e.g., layers 202, 204) are shown in FIGS. 3A-3D. Each of the two or more layers may include any suitable polymer. Suitable polymers may include, for example, natural or regenerated cellulose, PTFE (e.g., ePTFE), polyimide, fiberglass, ultra high molecular weight polyethylene (UHMWPE), carbon fiber, graphene, fluorinated ethylene propylene (FEP), or fluoropolymer. Suitable polymers may include thermosetting polymers including epoxy, peroxide, sulfur, UV, or other cross-linked polymers. The two or more layers may each include the same material (e.g., bonding two or more layers of ePTFE together, bonding two or more layers of cellulose together, etc.) or, as illustrated in FIG. 3A, a combination of different polymers can be bonded to make an illustrative article 300, such as a first polymer layer 302 that is, or includes, ePTFE and a second layer 304 that is, or includes, PTFE. In some embodiments, the first polymer layer 302 that is, or includes, PTFE may be bonded to a second layer 304 that is, or includes, cellulose. The first polymer layer 302 may be a layer of sintered ePTFE and the second layer 304 may be a layer of unsintered ePTFE, oriented 90 degrees from the first polymer layer 302, as another example.

Figure 3B:
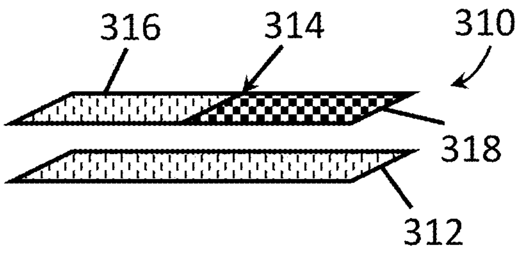

In some embodiments, the polymer article may additionally or alternatively include one or more layers, each including two or more different polymer regions within the polymer layer. FIG. 3B shows layers in an illustrative polymer article 310 according to such an embodiment, which may include, for example, the first polymer layer 312 that is, or includes, ePTFE and a second layer 314 including an first region 316 (e.g., that is, or includes, ePTFE) and a second region 318 (e.g., that is, or includes PTFE).

Figure 3C:
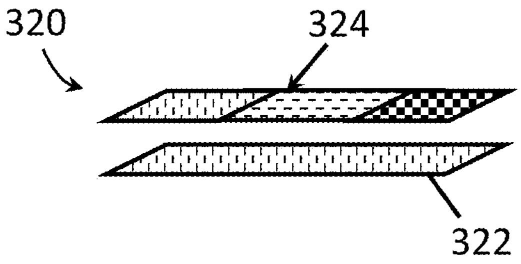
Figure 3D:
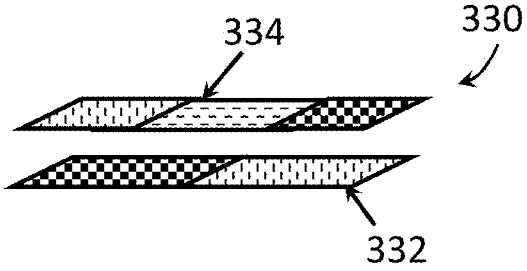

Likewise, FIG. 3C shows another illustrative article 320 according to one or more embodiments, which includes a first polymer layer 322 that is, or includes, ePTFE and a second layer 324 including three polymer regions. FIG. 3D shows yet another illustrative article 330 according to one or more embodiments, which includes a first polymer layer 332 including two polymer regions and a second layer 334 including three polymer regions. It will be understood in light of the present disclosure that many more configurations are possible, including, for example, two or more layers, each layer having one or more polymer regions.

In some embodiments, the one or more layers may together and/or separately be suitable filter media with a permeability. Such embodiments may be useful, for example, in liquid filtration, depth filtration, and adhesive-less and low lamination cost liquid filtration. For another example, multi-layer membranes may be advantageous for applications such as fuel filtration.

Each of the two or more layers may be of any suitable thickness, which will impact, at least in part, the structural integrity of the layer(s) to withstand the pressing operation. Suitable polymer layer thicknesses may include, for example, 0.002 millimeters (mm) (0.0001 inches). For other examples, suitable polymer layer thicknesses may be between 0.002 mm and 3 mm. In some embodiments, the thicknesses of one or more of the layers is 0.001 mm or greater. In some embodiments, the thicknesses of one or more of the layers is 0.05 mm or greater. In some embodiments, the thicknesses of one or more of the layers is 0.1 mm or greater. In some embodiments, the thicknesses of one or more of the layers is 3 mm or less, 5 mm or less, or 10 mm or less. In some embodiments, relatively thin layers may be advantageous, such as by eliminating the need to constrain the edges of the layers (e.g., to prevent spill-out).

In one or more embodiments, one or more of the layers may be web materials. Web materials may be advantageous, for example, because they can be handled and controlled from the edges.

In one or more embodiments, the one or more layers may include cellulose. For example, a method of manufacturing a cellulose article may include placing a first cellulose layer in contact with a second cellulose layer and pressing the first cellulose layer against the second cellulose layer between two pressing surfaces to a pressure of at least 10,000 psi, thereby forming a bond between the first cellulose layer and the second cellulose layer. In such embodiments, the bond formed between the first and second cellulose layers may be releasable by contact with water. The bond formed between a first regenerated cellulose membrane layer and second regenerated cellulose membrane layer can be reliably releasable by contact with water, as an example. The bond formed between a first cellulose acetate membrane layer and a second cellulose acetate membrane layer may not be reliably releasable by contact with water, as another example.

A water-releasable bond may be useful, for example, as a temporary bond for use in manufacturing. A temporary bond might be useful to improve the structural stability of the layers for manufacturing processes such as a pleating operation. After the manufacturing operation, the bond can be released with water (or other fluid) for its intended end use. Such a process may advantageously allow the elimination of the use of adhesive materials during manufacturing operations for high purity applications such as, for example, medical or pharmaceutical products. Another example of a manufacturing process where a temporary bond may be advantageous is in manufacturing of a spiral-wound product, such as a spiral-wound sheet of two or more layers. In such an example, the two or more layers can be temporarily bonded for improved handling prior to the winding operation. The temporary bond between the two or more layers can be released prior to winding so that the layers can slide relative to each other to compensate for differences in circumferential lengths.

In some implementations, such as where the intended final product is a thin, relatively weak layer of material, the layer can be temporarily bonded to a liner to increase structural integrity. Such a liner may advantageously reduce damage to the layer of material during manufacturing and/or handling of the material (e.g. a composite). The liner can be removed from the layer of material at a later time when the liner is no longer needed, such as when risk of damage to the layer of material during subsequent processing steps are reduced, or after particular processing steps are complete that may have otherwise resulted in damage to the layer of material.

A temporary bond may be advantageous for handling relatively thin chromatography film. A temporary bond may be advantageously used as a packaging indicator to indicate if a product (such as equipment) got wet in shipment and handling. A temporary bond may be advantageously used to aid recycling of paper products. A temporary bond may advantageously be used for some feminine hygiene or disposable diaper products to aid either manufacture or use. A temporary bond may advantageously be used for a wettable wipe that holds a desirable shape (e.g., during transportation and storage), and then releases the shape upon wetting (e.g., prior to use). A temporary bond may be advantageously used as component of a bandage or wrap.

Without wishing to be bound by theory, bonds between cellulose layers that swell a minimum amount in response to absorbing liquid water may reliably release upon being submerged in water. Without wishing to be bound by theory, membranes that do not swell a minimum amount in response to absorbing liquid water may not reliably release upon being submerged in liquid water. The minimum amount may range, for example, from 0.5% to 10% by volume or 1% to 7% by volume.

In one experiment, two layers of regenerated cellulose membrane were bonded under high pressure consistent with the methods disclosed herein. Upon absorption of water, the bond between the layers released. In another experiment, two layers of cellulose acetate membrane were bonded under high pressure consistent with the methods disclosed herein. Upon absorption of water, the bond between the layers did not release.

In some embodiments, each of the one or more cellulose layers may be a permeable fibrous substrate having a particle filtration efficiency. In such embodiments, each of the cellulose layers may together and/or separately be filter media with a permeability.

Cellulose is an organic compound with the formula $(C_6H_{10}O_5)_n$, a polysaccharide consisting of a linear chain of several hundred to many thousands of $\beta(1\rightarrow4)$ linked D-glucose units. Cellulose is the main substance of a plant's cell walls, helping plants to remain stiff and upright, hence, it can be extracted from plant sources, agriculture waste, animals, and bacterial pellicle. Any suitable configuration of cellulose may be used. Suitable configurations of cellulose may include, for example, fibrous substrates, polymorphs of cellulose (e.g., cellulose I, II, III, and IV), microcrystalline cellulose, microcellulose, nanocellulose (e.g., nanofibrillated cellulose, nanocrystalline cellulose, bacterial nanocellulose), and films. Furthermore, any suitable type of cellulose may be used. Suitable types of cellulose may include, for example, cellulose acetate, regenerated cellulose, modified regenerated cellulose, regenerated cellulose membrane, paper, natural (plant) fibers (e.g., fibers extracted from plants such as sisal, cotton, jute, bamboo, wood), bacterial cellulose, ethylcellulose, hydroxypropyl cellulose, and textile.

PTFE

In some embodiments, one or more of the layers may include PTFE. For example, two or more layers of PTFE may be bonded together. In such embodiments, the bond formed by methods and apparatuses disclosed herein may be advantageous to replace an adhesive bond, such as for use in medical devices and in manufacturing of bulk PTFE parts.

Bonding two or more layers of PTFE together using methods and apparatuses disclosed herein may be advantageous over adhesive bonding, for example, because adhesives may be difficult to adhere to PTFE.

In one or more embodiments according to the present disclosure, one or more of the layers may include ePTFE. Expanded PTFE may be described as having a porous microstructure, including a web of fibrils and nodes. In embodiments including ePTFE, the polymer article may include a porous microstructure (e.g., from the ePTFE). Suitable ePTFE materials may include, for example, sintered ePTFE and unsintered ePTFE.

Anisotropic materials, such as ePTFE, may be described as oriented, or having an orientation. By adjusting the relative orientation of one or more ePTFE layers in a polymer article according to one or more embodiments, solid or porous ePTFE components may be given useful physical strength properties, such as, for example, higher tensile strength, low creep, or higher fatigue. For example, the tensile strength is 10,000 psi and above.

In some embodiments, one or more ePTFE layers may be bonded to a housing, such as a PTFE housing.

In one or more embodiments, the bonding pressure may be used to selectively change the properties of one or more regions of the polymer article. For example, dent line-type shapes, grids, dot matrices, etc. may be pressed into the polymer article (e.g., a polymer article including ePTFE) to adjust a rupture pressure and/or a rupture location, such as in a rupture disc. Properties may be selectively adjusted, advantageously, without high temperatures that can negatively impact other properties, such as pore size (e.g., pore size of an ePTFE layer). Furthermore, properties may be selectively adjusted, advantageously, without cutting the media. In other words, the properties (e.g., rupture properties) may be selectively adjusted by forming breaks (e.g., fractures, cuts, etc.) in individual fibrils of a cohesive, or unitary, media.

In another example, properties of one or more regions of a polymer article may be altered to form a polymer article with a series of regions having respective rupture pressures (e.g., tailored burst properties or controlled failure properties), such as progressive rupture pressures (e.g., multiple failure stages) for use as a rupture vent or a breathable rupture vent. Such an embodiment may be useful, for example, for progressive rupture venting by having progressive intensity of dents in various shapes (e.g., corresponding to progressively decreasing rupture pressures) that would burst one portion of vent at a first pressure (e.g., to relieve an overpressure event), then progressively burst another portion at a second pressure (e.g., a pressure higher than the first pressure to relieve an overpressure event that was not sufficiently relieved by bursting of the first vent) to increase venting. Such polymer articles with progressive venting properties may be useful, for example, to replace stainless steel rupture discs, such as stainless steel rupture discs used in chemical piping and pumping systems. Polymer articles with progressive venting properties may be advantageous for use in battery housings, such as in battery housings for electric vehicles, as another example.

In yet another example, the properties of one or more regions of the polymer article may be selected (e.g., altered or adjusted) by adjusting the bonding pressure. For example, by progressively increasing the bonding pressure to introduce progressive rupture properties.

In still another example, the polymer article may be given progressive rupture venting properties by bonding layers of ePTFE with various rupture properties to introduce progressive venting properties. In an illustrative embodiment the polymer article 320 shown in FIG. 3C, the second layer 324 may include three ePTFE regions, each region made with a respective ePTFE giving the region respective rupture properties. Such an illustrative embodiment may additionally or alternatively include three regions having respective porosities.

In still yet another example, an ePTFE layer (or other porous layer) may be bonded to a non-porous layer (e.g., a non-porous PTFE film or another material carrier) with cut-out windows defined by the non-porous polymer layer. Some of such cut-out windows can lack the non-porous layer to define areas available for filtration by the porous layer. In some embodiments, one or more of such cut-out windows can have the non-porous layers extending across a downstream face of the porous layer. In such examples, if the pressure drop exceeds a threshold, the non-porous polymer layer may release from the porous layer, exposing an additional area of the porous layer for filtration. Such a configuration may be advantageous for components where a pressure drop exceeding a threshold may lead to damage of such components. Progressive filters can be used, for example, in military equipment air filtration, liquid filtration in industrial applications, or for air intake for a compressor. In such an example, the windows in the non-porous polymer layer of the polymer article may establish regions with the porous qualities of the ePTFE (e.g., mounted membranes on an otherwise non-porous article).

Pressing Surfaces

In one or more embodiments, one or both pressing surfaces (e.g., the pressing surfaces 210, 212) may include a rough surface. For example, an illustrative method of manufacturing may include placing a first polymer layer in contact with a second layer and pressing the first and second layers between a first pressing surface and a second pressing surface to a pressure of at least 10,000 psi, thereby forming a bond between the first and second layers, one or both of the first pressing surface and the second pressing surface including a rough surface.

Although smooth, hard pressing surfaces with radiused edges (e.g., chamfered edges) have been thought to be best practice, it has been discovered, as described herein, that the polymer article and/or the one or more layers may be pressed together using a rough surface (e.g., a surface with a controlled texture) and/or a surface without a chamfered edge. Advantages of an unchamfered edge may include allowing a whole tooling surface to be polished or textured and to maintain integrity of dimensions over tool lifetime, particularly in high volume production operations, for example.

In one or more embodiments, one or both pressing surfaces (e.g., the pressing surfaces 210, 212) may include a rough surface. For example, one or both pressing surfaces may have a pitted steel pressing surface. Additional or alternative examples of rough pressing surfaces may include a surface (e.g., of a stainless steel sheet) with hexagonally arranged dome shapes, a porous sintered surface (e.g., of a steel disc or a steel sheet), ball bearings captured in the pressing surface (e.g., in a hexagonal pattern), a woven mesh screen (e.g., made of steel), and a sheet (e.g., a stainless steel sheet) with a pattern (e.g., weave pattern, woven pattern, etc.).

Roughness of the pressing surfaces (e.g., the pressing surfaces 210, 212) may be quantified, for example, as grit, Sa (area roughness), Ra (profile roughness), or root mean square (RMS). One or both of the first and second pressing surfaces may each have a surface roughness of 0.1 micrometer (um), as one example, which may form a stronger bond between the two or more layers compared to smooth pressing surfaces. A surface roughness of 1 um may form cuts and tears in the layers, as another example, which may be undesirable in some embodiments. In some examples where the surface roughness of the pressing surfaces is quantified in terms of grit, the grit can be consistent with that discussed below with respect to sandpaper used as the one or more flexible backer layers (e.g., the flexible backer layers 206, 208).

Advantages of a rough pressing surface may include reduced probability of cutting the polymer article or layers at the edge of the pressing surface. Another advantage of a rough pressing surface may include improving ease of releasing the pressed polymer article or layers from the pressing surfaces after pressing. Advantages of a rough pressing surface relative to a smooth pressing surface may further include increased bond strength between the layers.

In one or more embodiments, a rough pressing surface may advantageously impart a three-dimensional bond interface, or bond structure, between the two or more layers. In other words, a rough pressing surface may result in a non-planar or an embossed bond interface. Without wishing to be bound by theory, such a three-dimensional, non-planar, or embossed bond interface may improve bond strength by increasing the relative surface area of the bond.

In some embodiments, one or both of the first and second pressing surfaces (e.g., the pressing surfaces 210, 212) may include a controlled texture. A controlled texture may be useful to emboss a pattern to change the material properties, such as filtration properties, relative to the un-embossed regions, as an example.

One or both of the first and second pressing surfaces (e.g., the pressing surfaces 210, 212) may be porous in various implementations, which may have advantages discussed in detail below with respect to a porous flexible backer layer, particularly if a porous flexible backer layer is not employed. Porosity in the pressing surface may help prevent the formation of a vacuum and encourage release of the article from the pressing surface, as one example. In some embodiments, one or both of the first and second pressing surfaces is porous sintered steel, such as a steel disc or a steel sheet, as examples.

Porous Microstructure

In one or more embodiments, each of the one or more layers and/or the polymer article may include a porous microstructure (e.g., including fibrils, nodes, and/or fibers, etc.). After pressing the one or more layers together, thereby producing the polymer article, the respective microstructure of each polymer layer may be maintained (e.g., the porous microstructure may be observable and/or the permeability of the polymer layer(s) may be maintained). The porous microstructure may be compressed vertically by the bonding pressure, which may be observable, for example, as individual nodes being flattened, high density areas appearing to be in close contact, and fibrils displaying physical cracks and/or fractures.

Figure 4:
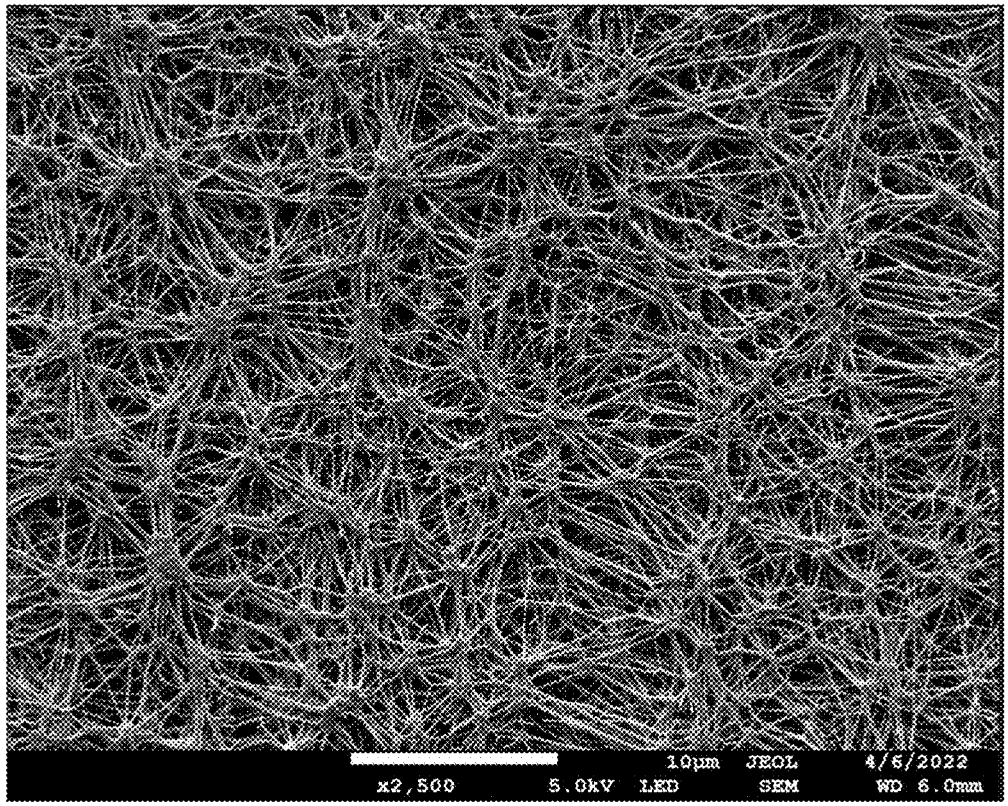
FIG. 4 is a scanning electron microscopy (SEM) image of an illustrative polymer layer before compression using the method of FIG. 1 or the apparatus of FIG. 2.
Figure 5A:
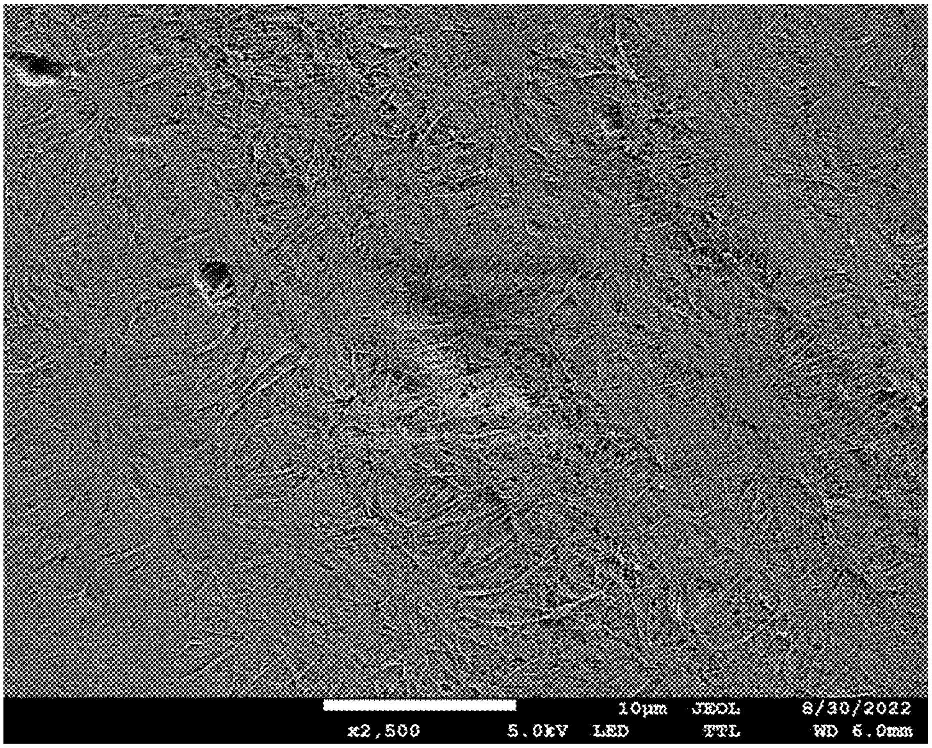
FIGS. 5A-5B are SEM images of an illustrative polymer article having two layers compressed together to form a bond between the layers using the method of FIG. 1 or the apparatus of FIG. 2.
Figure 5B:
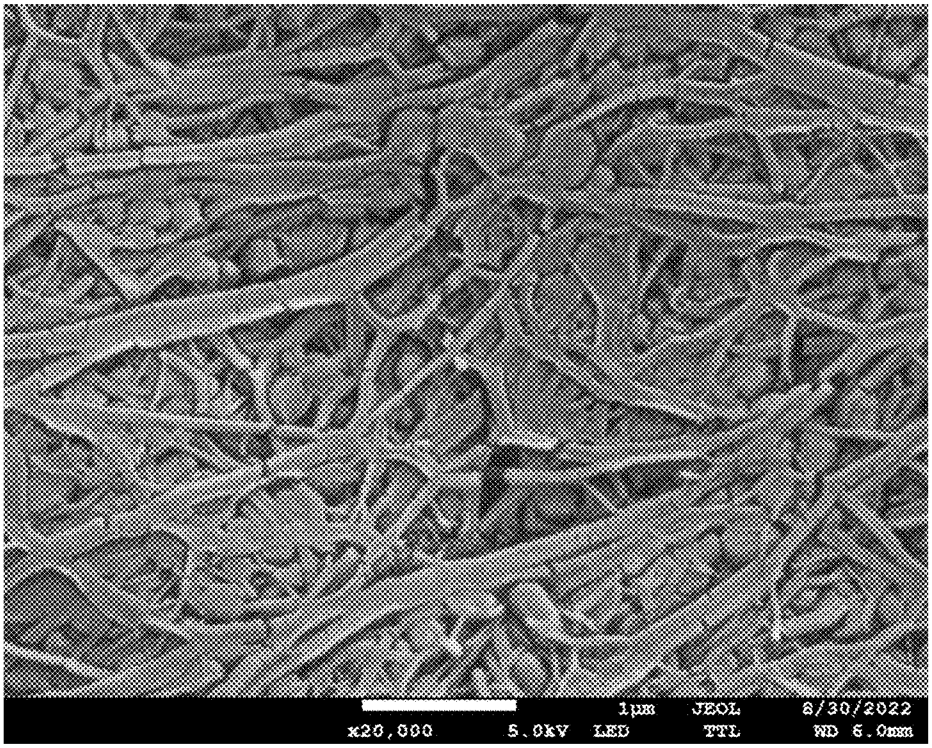

The porous microstructure of the layers and/or the polymer article may be observable, for example, using scanning electron microscopy (SEM), as shown in FIGS. 4-5B. FIG. 4 shows an SEM image of an illustrative polymer layer (a sintered ePTFE sheet) before compression, illustrating the porous microstructure having a plurality of nodes and a plurality of fibers interconnecting the nodes. FIGS. 5A and 5B each show an SEM image of an illustrative polymer article having two layers (a sintered ePTFE sheet and an unsintered ePTFE sheet) compressed together (to a bonding pressure of 44,000 psi) to form a bond between the layers. Each of FIGS. 5A and 5B illustrates the changes in the porous microstructure, observable, for example, in flattened nodes, fractured fibrils, and compaction of high-density regions.

Additional changes in the physical characteristics of the materials as a result of compression at higher than traditional pressures may be observable. For example, ePTFE materials, which may be described as opaque, may be described as clear or transparent after compression. Without wishing to be bound by theory, the change in clarity may be due to reduction of surfaces available to reflect, absorb, and/or refract light as nodes flatten and microstructure surfaces come in closer contact. Without wishing to be bound by theory, the change in clarity may additionally or alternatively be due to the material becoming thinner. Furthermore, without wishing to be bound by theory, the bond formed by compression of the layers may be due to mechanical interlock of structures (e.g., polymer chains), and/or Van der Waals forces at the interfaces where structures of the polymer surfaces are in close contact with each other.

Fractured Fibrils/Fibers

In one or more embodiments, articles may include a porous microstructure including fractured and/or broken fibrils. Such fractured and broken fibrils can be a result of the relatively high pressure of the pressing operation used to bond the material. An illustrative article may include a first polymer layer including a surface and a porous microstructure, the porous microstructure having 1 to 100 fractured fibrils per square micrometer. A second layer has a surface adjacent to and bonded to the surface of the first polymer layer. Also as a result of the bonding pressures disclosed herein, the fibrils of the first polymer layer are flattened relative to the fibrils prior to exposure to the bonding pressure. In some embodiments, the porous microstructure may have flattened fibril widths of 0.01 um or greater. In some embodiments, the porous microstructure may have flattened fibril widths of 0.05 um or greater. In some embodiments, the porous microstructure may have fractured fibrils widths of 0.1 um or greater. In some embodiments, the porous microstructure may have fractured fibrils widths of 0.2 um or less, 0.5 um or less, or 1 um or less. In one example, the porous microstructure may have fractured fibrils widths of between 0.05 um and 0.5 um. In another example, the porous microstructure may have fractured fibrils widths of between 0.01 um and 0.2 um. In an example, the porous microstructure may have 0 to 2 fiber breaks per square micrometers. In another example, the porous microstructure may have 10 to 50 fractured fibrils and no fiber breaks per square micrometer.

Flattened Nodes

In one or more embodiments, articles may include a porous microstructure including flattened and/or fractured nodes. An illustrative article may include a first polymer layer including a surface and a porous microstructure, the porous microstructure having 1 to 100 visibly flattened nodes per 25 square micrometers at 20,000× magnification. A second layer has a surface adjacent to and bonded to the surface of the first polymer layer. In an example, the porous microstructure may have 10 to 50 visibly flattened nodes per 25 square micrometers at 20,000× magnification. The term "visibly flattened nodes" means that, at 20,000× magnification, the nodes appear to have an exposed visible surface (such as a top surface) that is flat as opposed to rounded consistently with a surface of a sphere. In some embodiments at least a portion of the flattened nodes exhibit fractures at the outer boundaries at 20,000× magnification.

In some embodiments, the porous microstructure may have nodes having an equivalent diameter of 0.05 um or greater. In some embodiments, the porous microstructure may have nodes having an equivalent diameter of 0.1 um or greater. In some embodiments, the porous microstructure may have nodes having an equivalent diameter of 0.5 um or greater. In some embodiments, the porous microstructure may have nodes having an equivalent diameter of 0.2 um or less, 0.5 um or less, or 1 um or less. In an example, the porous microstructure may have nodes having an equivalent diameter between 0.1 um and 1 um. The equivalent diameter is defined as the diameter of a circle with an equal aggregate sectional area, which is calculated by d=2 Area/π(2 times Area divided by pi).

In one or more embodiments, compressed articles may have reduced thickness relative to the combined thickness of the uncompressed layers. Thickness of the polymer article may be, for example, 20% or less, 15% or less, 10% or less, or 5% or less of the thickness of the uncompressed layers. In an example, the uncompressed layers may have a thickness of 0.006 inches, which may be reduced to an article thickness of 0.0005 inches after compression.

Flexible Backer Layers

In some embodiments, methods and apparatuses may include one or more flexible backer layers. An illustrative method may include, for example, placing a first polymer layer in contact with a second layer, placing a flexible backer layer between the first polymer layer and a first pressing surface, and pressing the first and second layers between the first pressing surface and a second pressing surface to a pressure of at least 10,000 psi, thereby forming a bond between the first polymer layer and the second layer. Such a method may further include placing a second flexible backer layer between the second layer and the second pressing surface.

As an example, the illustrative apparatus 200 may include one or more flexible backer layers placed between one or both of the layers 202, 204 and one or both of the pressing surfaces (e.g., the first pressing surface 210 and the second pressing surface 212). The one or more flexible backer layers may include, for example, the first flexible backer layer 206 between the first polymer layer 202 and the first pressing surface 210. In one or more embodiments, the second flexible backer layer 208 may be located between the second layer 204 and the second pressing surface 212.

Characteristics of the one or more flexible backer layers may include, for example, porosity, compliance, elastic modulus, thickness, and roughness.

In one or more embodiments, the one or more flexible backer layers may include paper, which may provide compliance to reduce peak stress (e.g., to improve uniformity of pressure) across the layers and, particularly, at the edges of the pressing surfaces to help prevent cutting the layers. That is to say, the one or more flexible backer layers may deflect under the bonding pressure to relieve stress on the layers at the edges of the pressing surfaces. In an example, a flexible backer layer 0.005 inches thick may deflect 10% under the bonding pressure, which may create a more gradual transition between the compressed portions, or regions, of the layers (e.g., the portions, or regions, between the pressing surfaces) and the uncompressed portions, or regions, of the layers (e.g., the portions, or regions, extending outside of the pressing surfaces) as compared to compressing layers without utilizing a flexible backer layer.

The flexible backer layers may be useful to help release the polymer article without damaging the article after it has been pressed between the pressing surfaces. The flexible backer layers may be porous to allow air flow (e.g., to prevent vacuum formation) to help release the polymer article, as an example. The flexible backer layers may be selected to have low adhesion to the pressing surfaces to help release the polymer article from the pressing surfaces, as another example. As yet another example, the flexible backer layers may be selected to have low adhesion to the surfaces of the layers to help release the polymer article from the flexible backer layer(s).

In some embodiments, the one or more flexible backer layers may include a surface roughness additionally or alternatively to the rough pressing surface discussed above. Suitable flexible backer layers with the surface roughness may include, for example, 20-560 (US-/inch) mesh steel, stainless steel, fiberglass, polymer (e.g., nylon, PEEK, Polypropylene, etc.), Dutch weave, or other woven metal or fabric (e.g., stainless steel with any mesh size for example 325×2,300), metal wool (e.g., stainless or aluminum wool), natural fiber, synthetic fiber, metal fabric, or non-woven material (e.g., polymer or natural fiber scrims), felts, papers, sandpaper, a sheet (e.g., a steel or plastic sheet) with a pattern (e.g., weave pattern, woven pattern), a sheet (e.g., a steel or plastic sheet) with hexagonally arranged dome shapes, a woven mesh screen (e.g., a steel mesh screen), captured ball bearings in a hexagonal pattern (e.g., on the second pressing surface 212 of the pressing tool 216), and a porous sintered steel (e.g., a steel disc or a steel sheet).

In some embodiments, where the flexible backer layer is a sandpaper, the sandpaper generally has an abrasive material, such as sand, disposed on a backing layer. The abrasive material can form a pattern on the backing layer, but in other embodiments the abrasive is relatively evenly distributed across the backing layer. The abrasive material can be silicon carbide aluminum oxide, zirconia alumina, silicon carbide, ceramic alumina, diamond, similar materials, and/or combinations thereof. The backing layer can be any suitable material such as, for example, paper, cloth, plastic, or rubber. In some embodiments, the sandpaper may be 60 grit or greater. In some embodiments, the sandpaper may be 10,000 grit or less. In some embodiments, the sandpaper is a 600-grit silicon carbide abrasive sandpaper that has a paper backing.

The one or more flexible backer layers may each have a surface roughness of 0.1 micrometer, as one example, which may form a stronger bond between the two or more layers relative to smooth pressing surfaces with no flexible backer layers. A surface roughness of 1 micrometer may form cuts and tears in the layers, as another example, which may be undesirable in some embodiments. The material properties of the layers, such as thickness, flexibility, and strength, may be relevant to the response of the layers to the surface roughness of the pressing surface at the bonding pressure.

In embodiments using sandpaper as a flexible backer layer, any suitable sandpaper grit may be used. For example, 50 grit or less, 80 grit or less, 120 grit or less, 200 grit or less, 400 grit or less, 600 grit or less, or 1,000 grit or less, and/or 700 grit or greater, 500 grit or greater, 300 grit or greater, 100 grit or greater, or 50 grit or greater. In some embodiments, a lower grit (e.g., 80 grit or less) may be useful, for example, to press thicker layers together. At a lower grit, the abrasive materials of the sandpaper flexible backer layer may press holes through a polymer layer if the polymer layer is sufficiently thin. In some embodiments, a higher grit (e.g., 600 grit or greater) may be useful, for example, to press thinner layers together, or to avoid pressing holes through the layers.

Compliant Layer

In one or more embodiments, methods and apparatuses may include one or more compliant layers. An illustrative method may include placing a compliant layer between a first pressing surface and a press (e.g., the bed of a press), placing a first polymer layer in contact with a second layer, and pressing the first and second layers between the first pressing surface and a second pressing surface to a pressure of at least 10,000 psi, thereby forming a bond between the first polymer layer and the second layer. Such a method may further include placing a second compliant layer between the second pressing surface and the press (e.g., the ram of a press).

Including one or more compliant layers may be advantageous to improve uniformity of pressure across the surfaces of the polymer articles, as an example, which may help avoid cutting of the layers and/or achieve uniform bond strength across the resulting article. A compliant layer may include any suitable material. Suitable compliant layer materials may include, for example, plastic, rubber, or soft metal (e.g., brass). The one or more compliant layers may each be a 0.75-inch sheet of UHMW plastic, as one example.

Characteristics of the one or more compliant layers may include, for example, compressive stress uniformity, elastic modulus, compliance, and thickness.

Rough Article Surface

In one or more embodiments, articles formed with the present technology may define a rough surface. An illustrative article may include a first polymer layer having a first surface and a second surface, the first surface including a rough surface and a second layer having a surface adjacent to and bonded to the second surface of the first polymer layer. In such an article, the second layer may further include a second surface having a rough surface. The surface roughness may result from the pressing operation where one or both pressing surfaces exhibits a surface roughness.

Thermal/Laser Sintering

In one or more embodiments, methods and apparatuses may include sintering the one or more layers to form a supplemental bond. An illustrative method may include placing a first polymer layer in contact with a second layer, pressing the first and second layers between the first pressing surface and a second pressing surface to a pressure of at least 10,000 psi, thereby forming a bond between the first polymer layer and the second layer, and sintering the first polymer layer and the second layer to form a supplemental bond. In such a method, the sintering may include, for example, laser sintering or thermal sintering.

As discussed above, some embodiments may include sintering before or after pressing the two or more layers together, for example, with a laser or other heat source. In such embodiments, sintering may be used to modify various properties (e.g., handling and strength) of the polymer article. Additionally or alternatively, sintering may be used to modify various properties of the one or more layers together and/or separately.

Testing

Bond strength between the layers may be characterized, for example, using peel testing or shear testing.

In illustrative peel testing, unsintered and sintered ePTFE sheets were pressed at 44,000 psi to prepare 0.375-inch-wide polymer articles. The layers were clamped into jaws of a Dynamic Mechanical Analysis (DMA) apparatus to perform testing measuring the tensile strength of the bond between the layers being peeled apart (e.g., separated like a sticker from its backing). In the peel test, up to 0.1 Newton (N) tensile strength was observed.

In illustrative shear testing, unsintered and sintered ePTFE sheets were pressed at 44,000 psi to prepare 0.375-inch-wide polymer articles. The layers were clamped into jaws of a DMA apparatus to perform testing measuring the tensile strength of the bond between the layers being pulled apart. In the shear test, up to 1 N tensile strength was observed.

Illustrative Aspects

Aspect 1 is a method of manufacturing a cellulose article, the method comprising:

placing a first cellulose layer in contact with a second cellulose layer; and pressing the first cellulose layer against the second cellulose layer between a first pressing surface and a second pressing surface to a pressure of at least 10,000 psi, thereby forming a bond between the first cellulose layer and the second cellulose layer;

wherein the bond is releasable by contact with water.

Aspect 2 is a method as in any one of Aspects 1 and 3-21, wherein the first pressing surface comprises a rough surface.

Aspect 3 is a method as in any one of Aspects 1-2 and 4-21, wherein the cellulose article comprises a permeable fibrous substrate having a particle filtration efficiency.

Aspect 4 is a method as in any one of Aspects 1-3 and 5-21, further comprising placing a flexible backer layer between the first cellulose layer and the first pressing surface.

Aspect 5 is a method as in any one of Aspects 4 and 6-7, wherein the flexible backer layer comprises paper.

Aspect 6 is a method as in any one of Aspects 4-5 and 7, wherein the flexible backer layer comprises sandpaper.

Aspect 7 is a method as in any one of Aspects 4-6, wherein the flexible backer layer has a yield strength less than a yield strength of the first pressing surface.

Aspect 8 is a method as in any one of Aspects 1-7 and 9-21, further comprising placing a compliant layer between the first pressing surface and a press.

Aspect 9 is a method as any one of Aspects 1-8 and 10-21, wherein the cellulose article comprises fractured fibers.

Aspect 10 is a method as any one of Aspects 1-9 and 11-21, wherein the cellulose article comprises a rough surface.

Aspect 11 is a method as any one of Aspects 1-10 and 12-21, wherein the cellulose article comprises a three-dimensional bond interface.

Aspect 12 is a method as any one of Aspects 1-11 and 13-21, further comprising sintering the first cellulose layer and the second cellulose layer to form a supplemental bond between the first cellulose layer and the second cellulose layer.

Aspect 13 is a method as in any one of Aspects 12 and 14, wherein the sintering is laser sintering.

Aspect 14 is a method as in any one of Aspects 12-13, wherein the sintering is thermal sintering.

Aspect 15 is a method as in any one of Aspects 1-14 and 16-21, wherein the pressure is 30,000 psi or greater.

Aspect 16 is a method as in any one of Aspects 1-15 and 17-21, wherein the pressure is 45,000 psi or greater.

Aspect 17 is a method as in any one of Aspects 1-16 and 18-21, wherein the pressure is 55,000 psi or greater.

Aspect 18 is a method as in any one of Aspects 1-17 and 19-21, wherein the pressure is 75,000 psi or greater.

Aspect 19 is a method as in any one of Aspects 1-18 and 20-21, wherein the pressure is 100,000 psi or greater.

Aspect 20 is a method as in any one of Aspects 1-19 and 21, wherein the first pressing surface has a yield strength of at least the pressure.

Aspect 21 is a method as in any one of Aspects 1-20, wherein the cellulose article has a thickness of less than 15% of a thickness of the first cellulose layer and the second cellulose layer before the pressing.

Aspect 22 is a method of manufacturing a polymer article, the method comprising:

placing a first polymer layer in contact with a second layer; and pressing the first polymer layer and the second layer between a first pressing surface and a second pressing surface to a pressure of at least 10,000 psi, thereby forming a bond between the first polymer layer and the second layer, the first pressing surface comprising a rough surface.

Aspect 23 is a method as in any one of Aspects 22 and 24-47, wherein one or both of the first polymer layer and the second layer comprises cellulose.

Aspect 24 is a method as in any one of Aspects 22-23 and 25-47, wherein the article comprises a permeable fibrous substrate having a particle filtration efficiency.

Aspect 25 is a method as any one of Aspects 22-24 and 26-47, wherein the article comprises fractured fibers.

Aspect 26 is a method as in any one of Aspects 22-25 and 27-47, wherein one or both of the first polymer layer and the second layer comprises PTFE.

Aspect 27 is a method as in any one of Aspects 22-26 and 28-47, wherein one or both of the first polymer layer and the second layer comprises expanded PTFE.

Aspect 28 is a method as in any one of Aspects 22-27 and 29-47, wherein one or both of the first polymer layer and the second layer comprises a fluoropolymer.

Aspect 29 is a method as in any one of Aspects 22-28 and 30-47, wherein the article comprises a porous microstructure.

Aspect 30 is a method as in any one of Aspects 22-29 and 31-47, further comprising placing a flexible backer layer between the first polymer layer and the first pressing surface.

Aspect 31 is a method as in any one of Aspects 30 and 32-33, wherein the flexible backer layer comprises paper.

Aspect 32 is a method as in any one of Aspects 30-31 and 33, wherein the flexible backer layer comprises sandpaper.

Aspect 33 is a method as in any one of Aspects 30-32, wherein the flexible backer layer has a yield strength less than a yield strength of the first pressing surface.

Aspect 34 is a method as in any one of Aspects 22-33 and 35-47, further comprising placing a compliant layer between the first pressing surface and a press.

Aspect 35 is a method as in any one of Aspects 22-34 and 36-47, wherein the article comprises fractured fibrils or flattened nodes.

Aspect 36 is a method as in any one of Aspects 22-35 and 37-47, wherein the article comprises a rough surface.

Aspect 37 is a method as any one of Aspects 22-36 and 38-47, wherein the article comprises a three-dimensional bond interface.

Aspect 38 is a method as in any one of Aspects 22-37 and 39-47, further comprising sintering the first polymer layer and the second layer to form a supplemental bond between the first polymer layer and the second layer.

Aspect 39 is a method as in any one of Aspects 38 and 40, wherein the sintering comprises laser sintering.

Aspect 40 is a method as in any one of Aspects 38-39, wherein the sintering comprises thermal sintering.

Aspect 41 is a method as in any one of Aspects 22-40 and 42-47, wherein the pressure is 30,000 psi or greater.

Aspect 42 is a method as in any one of Aspects 22-41 and 43-47, wherein the pressure is 45,000 psi or greater.

Aspect 43 is a method as in any one of Aspects 22-42 and 44-47, wherein the pressure is 55,000 psi or greater.

Aspect 44 is a method as in any one of Aspects 22-43 and 45-47, wherein the pressure is 75,000 psi or greater.

Aspect 45 is a method as in any one of Aspects 22-44 and 46-47, wherein the pressure is 100,000 psi or greater.

Aspect 46 is a method as in any one of Aspects 22-45 and 47, wherein the article has a thickness of less than 15% of a thickness of the first polymer layer and the second layer before the pressing.

Aspect 47 is a method as in any one of Aspects 22-46, wherein the first pressing surface has a yield strength of at least the pressure.

Aspect 48 is a method of manufacturing an article, the method comprising:

placing a first polymer layer in contact with a second layer; and pressing the first polymer layer against the second layer between a first pressing surface and a second pressing surface to a pressure of at least 10,000 psi, thereby forming a bond between the first polymer layer and the second layer;

wherein the article comprises a porous microstructure.

Aspect 49 is a method as in any one of Aspects 48 and 50-70, wherein one or both of the first polymer layer and the second layer comprises PTFE.

Aspect 50 is a method as in any one of Aspects 48-49 and 51-70, wherein one or both of the first polymer layer and the second layer comprises expanded PTFE.

Aspect 51 is a method as in any one of Aspects 48-50 and 52-70, wherein one or both of the first polymer layer and the second layer comprises a fluoropolymer.

Aspect 52 is a method as in any one of Aspects 48-51 and 53-70, wherein the first pressing surface comprises a rough surface.

Aspect 53 is a method as in any one of Aspects 48-52 and 54-70, further comprising placing a flexible backer layer between the first polymer layer and the first pressing surface.

Aspect 54 is a method as in any one of Aspects 53 and 55-56, wherein the flexible backer layer comprises paper.

Aspect 55 is a method as in any one of Aspects 53-54 and 56, wherein the flexible backer layer comprises sandpaper.

Aspect 56 is a method as in any one of Aspects 53-55, wherein the flexible backer layer has a yield strength less than a yield strength of the first pressing surface.

Aspect 57 is a method as in any one of Aspects 48-56 and 58-70, further comprising placing a compliant layer between the first pressing surface and a press.

Aspect 58 is a method as in any one of Aspects 48-57 and 59-70, wherein the article comprises a rough surface.

Aspect 59 is a method as any one of Aspects 48-58 and 60-70, wherein the article comprises a three-dimensional bond interface.

Aspect 60 is a method as in any one of Aspects 48-59 and 61-70, further comprising sintering the first polymer layer and the second layer to form a supplemental bond between the first polymer layer and the second layer.

Aspect 61 is a method as in any one of Aspects 60 and 62, wherein the sintering is laser sintering.

Aspect 62 is a method as in any one of Aspects 60-61, wherein the sintering is thermal sintering.

Aspect 63 is a method as in any one of Aspects 48-62 and 64-70, wherein the pressure is 30,000 psi or greater.

Aspect 64 is a method as in any one of Aspects 48-63 and 65-70, wherein the pressure is 45,000 psi or greater.

Aspect 65 is a method as in any one of Aspects 48-64 and 66-70, wherein the pressure is 55,000 psi or greater.

Aspect 66 is a method as in any one of Aspects 48-65 and 67-70, wherein the pressure is 75,000 psi or greater.

Aspect 67 is a method as in any one of Aspects 48-66 and 68-70, wherein the pressure is 100,000 psi or greater.

Aspect 68 is a method as in any one of Aspects 48-67 and 69-70, wherein the article has a thickness of less than 15% of a thickness of the first polymer layer and the second layer before the pressing.

Aspect 69 is a method as in any one of Aspects 48-68 and 70, wherein the first pressing surface has a yield strength of at least the pressure.

Aspect 70 is a method as in any one of Aspects 48-69, wherein the article comprises fractured fibrils or flattened nodes.

Aspect 71 is a method of manufacturing an article, the method comprising:

placing a first polymer layer in contact with a second layer;

placing a flexible backer layer between the first polymer layer and a first pressing surface; and pressing the first polymer layer and the second layer between the first pressing surface and a second pressing surface to a pressure of at least 10,000 psi, thereby forming a bond between the first polymer layer and the second layer.

Aspect 72 is a method as in any one of Aspects 71 and 73-96, wherein one or both of the first polymer layer and the second layer comprises cellulose.

Aspect 73 is a method as in any one of Aspects 71-72 and 74-96, wherein the article comprises a permeable fibrous substrate having a particle filtration efficiency.

Aspect 74 is a method as in any one of Aspects 71-73 and 75-96, wherein the article comprises fractured fibers.

Aspect 75 is a method as in any one of Aspects 71-74 and 76-96, wherein one or both of the first polymer layer and the second layer comprises PTFE.

Aspect 76 is a method as in any one of Aspects 71-75 and 77-96, wherein one or both of the first polymer layer and the second layer comprises expanded PTFE.

Aspect 77 is a method as in any one of Aspects 71-76 and 78-96, wherein one or both of the first polymer layer and the second layer comprises a fluoropolymer.

Aspect 78 is a method as in any one of Aspects 71-77 and 79-96, wherein the first pressing surface comprises a rough surface.

Aspect 79 is a method as in any one of Aspects 71-78 and 80-96, wherein the article comprises a porous microstructure.

Aspect 80 is a method as in any one of Aspects 71-79 and 81-96, further comprising placing a compliant layer between the first pressing surface and a press.

Aspect 81 is a method as in any one of Aspects 71-80 and 82-96, wherein the article comprises fractured fibrils or flattened nodes.

Aspect 82 is a method as in any one of Aspects 71-81 and 83-96, wherein the article comprises a rough surface.

Aspect 83 is a method as any one of Aspects 71-82 and 84-96, wherein the article comprises a three-dimensional bond interface.

Aspect 84 is a method as in any one of Aspects 71-83 and 85-96, further comprising sintering the first polymer layer and the second layer to form a supplemental bond between the first polymer layer and the second layer.

Aspect 85 is a method as in any one of Aspects 84 and 86, wherein the sintering is laser sintering.

Aspect 86 is a method as in any one of Aspects 84-85, wherein the sintering is thermal sintering.

Aspect 87 is a method as in any one of Aspects 71-86 and 88-96, wherein the flexible backer layer comprises paper.

Aspect 88 is a method as in any one of Aspects 71-87 and 89-96, wherein the flexible backer layer comprises sandpaper.

Aspect 89 is a method as in any one of Aspects 71-88 and 90-96, wherein the flexible backer layer has a yield strength less than a yield strength of the first pressing surface.

Aspect 90 is a method as in any one of Aspects 71-89 and 91-96, wherein the pressure is 30,000 psi or greater.

Aspect 91 is a method as in any one of Aspects 71-90 and 92-96, wherein the pressure is 45,000 psi or greater.

Aspect 92 is a method as in any one of Aspects 71-91 and 93-96, wherein the pressure is 55,000 psi or greater.

Aspect 93 is a method as in any one of Aspects 71-92 and 94-96, wherein the pressure is 75,000 psi or greater.

Aspect 94 is a method as in any one of Aspects 71-93 and 95-96, wherein the pressure is 100,000 psi or greater.

Aspect 95 is a method as in any one of Aspects 71-94 and 96, wherein the article has a thickness of less than 15% of a thickness of the first polymer layer and the second layer before the pressing.

Aspect 96 is a method as in any one of Aspects 71-95, wherein the first pressing surface has a yield strength of at least the pressure.

Aspect 97 is a method of manufacturing an article, the method comprising:

placing a compliant layer between a first pressing surface and a press;

placing a first polymer layer in contact with a second layer; and pressing the first polymer layer and the second layer between the first pressing surface and a second pressing surface to a pressure of at least 10,000 psi, thereby forming a bond between the first polymer layer and the second layer.

Aspect 98 is a method as in any one of Aspects 97 and 99-122, wherein one or both of the first polymer layer and the second layer comprises cellulose.

Aspect 99 is a method as in any one of Aspects 97-98 and 100-122, wherein the article comprises a permeable fibrous substrate having a particle filtration efficiency.

Aspect 100 is a method as any one of Aspects 97-99 and 101-122, wherein the article comprises fractured fibers.

Aspect 101 is a method as in any one of Aspects 97-100 and 102-122, wherein one or both of the first polymer layer and the second layer comprises PTFE.

Aspect 102 is a method as in any one of Aspects 97-101 and 103-122, wherein one or both of the first polymer layer and the second layer comprises expanded PTFE.

Aspect 103 is a method as in any one of Aspects 97-102 and 104-122, wherein one or both of the first polymer layer and the second layer comprises a fluoropolymer.

Aspect 104 is a method as in any one of Aspects 97-103 and 105-122, wherein the first pressing surface comprises a rough surface.

Aspect 105 is a method as in any one of Aspects 97-104 and 106-122, wherein the article comprises a porous microstructure.

Aspect 106 is a method as in any one of Aspects 97-105 and 107-122, further comprising placing a flexible backer layer between the first polymer layer and the first pressing surface.

Aspect 107 is a method as in any one of Aspects 106 and 108-109, wherein the flexible backer layer comprises paper.

Aspect 108 is a method as in any one of Aspects 106-107 and 109, wherein the flexible backer layer comprises sandpaper.

Aspect 109 is a method as in any one of Aspects 106-108, wherein the flexible backer layer has a yield strength less than a yield strength of the first pressing surface.

Aspect 110 is a method as in any one of Aspects 97-109 and 111-122, wherein the article comprises fractured fibrils or flattened nodes.

Aspect 111 is a method as in any one of Aspects 97-110 and 112-122, wherein the article comprises a rough surface.

Aspect 112 is a method as in any one of Aspects 97-111 and 113-122, wherein the article comprises a three-dimensional bond interface.

Aspect 113 is a method as in any one of Aspects 97-112 and 114-122, further comprising sintering the first polymer layer and the second layer to form a supplemental bond between the first polymer layer and the second layer.

Aspect 114 is a method as in any one of Aspects 113 and 115, wherein the sintering is laser sintering.

Aspect 115 is a method as in any one of Aspects 113-114, wherein the sintering is thermal sintering.

Aspect 116 is a method as in any one of Aspects 97-115 and 117-122, wherein the pressure is 30,000 psi or greater.

Aspect 117 is a method as in any one of Aspects 97-116 and 118-122, wherein the pressure is 45,000 psi or greater.

Aspect 118 is a method as in any one of Aspects 97-117 and 119-122, wherein the pressure is 55,000 psi or greater.

Aspect 119 is a method as in any one of Aspects 97-118 and 120-122, wherein the pressure is 75,000 psi or greater.

Aspect 120 is a method as in any one of Aspects 97-119 and 121-122, wherein the pressure is 100,000 psi or greater.

Aspect 121 is a method as in any one of Aspects 97-120 and 122, wherein the article has a thickness of less than 15% of a thickness of the first polymer layer and the second layer before the pressing.

Aspect 122 is a method as in any one of Aspects 97-121, wherein the first pressing surface has a yield strength of at least the pressure.

Aspect 123 is a method of manufacturing an article, the method comprising:

placing a first polymer layer in contact with a second layer;

pressing the first polymer layer and the second layer between a first pressing surface and a second pressing surface to a pressure of at least 10,000 psi, thereby forming a bond between the first polymer layer and the second layer; and sintering the first polymer layer and the second layer to form a supplemental bond between the first polymer layer and the second layer.

Aspect 124 is a method as in any one of Aspects 123 and 125-145, wherein the sintering is laser sintering.

Aspect 125 is a method as in any one of Aspects 123-124 and 126-145, wherein the sintering is thermal sintering.

Aspect 126 is a method as in any one of Aspects 123-125 and 127-145, wherein the first polymer layer comprises cellulose.

Aspect 127 is a method as in any one of Aspects 123-126 and 128-145, wherein the article comprises a permeable fibrous substrate having a particle filtration efficiency.

Aspect 128 is a method as in any one of Aspects 123-127 and 129-145, wherein the article comprises fractured fibers.

Aspect 129 is a method as in any one of Aspects 123-128 and 130-145, wherein the first pressing surface comprises a rough surface.

Aspect 130 is a method as in any one of Aspects 123-129 and 131-145, wherein the article comprises a porous microstructure.

Aspect 131 is a method as in any one of Aspects 123-130 and 132-145, further comprising placing a flexible backer layer between the first polymer layer and the first pressing surface.

Aspect 132 is a method as in any one of Aspects 131 and 133-134, wherein the flexible backer layer comprises paper.

Aspect 133 is a method as in any one of Aspects 131-132 and 134, wherein the flexible backer layer comprises sandpaper.

Aspect 134 is a method as in any one of Aspects 131-133, wherein the flexible backer layer has a yield strength less than a yield strength of the first pressing surface.

Aspect 135 is a method as in any one of Aspects 123-134 and 136-145, further comprising placing a compliant layer between the first pressing surface and a press.

Aspect 136 is a method as in any one of Aspects 123-135 and 137-145, wherein the article comprises fractured fibrils or flattened nodes.

Aspect 137 is a method as in any one of Aspects 123-136 and 138-145, wherein the article comprises a rough surface.

Aspect 138 is a method as any one of Aspects 123-137 and 139-145, wherein the article comprises a three-dimensional bond interface.

Aspect 139 is a method as in any one of Aspects 123-138 and 140-145, wherein the pressure is 30,000 psi or greater.

Aspect 140 is a method as in any one of Aspects 123-139 and 141-145, wherein the pressure is 45,000 psi or greater.

Aspect 141 is a method as in any one of Aspects 123-140 and 142-145, wherein the pressure is 55,000 psi or greater.

Aspect 142 is a method as in any one of Aspects 123-141 and 143-145, wherein the pressure is 75,000 psi or greater.

Aspect 143 is a method as in any one of Aspects 123-142 and 144-145, wherein the pressure is 100,000 psi or greater.

Aspect 144 is a method as in any one of Aspects 123-143 and 145, wherein the article has a thickness of less than 15% of a thickness of the first polymer layer and the second layer before the pressing.

Aspect 145 is a method as in any one of Aspects 123-144, wherein the first pressing surface has a yield strength of at least the pressure.

Aspect 146 is an article comprising:

a first polymer layer comprising a surface and a porous microstructure, the porous microstructure comprising fractured fibrils; and a second layer comprising a surface adjacent to and bonded to the surface of the first polymer layer.

Aspect 147 is an article as in any one of Aspects 146 and 148-152, wherein one or both of the first polymer layer and the second layer further comprises PTFE.

Aspect 148 is an article as in any one of Aspects 146-147 and 149-152, wherein one or both of the first polymer layer and the second layer further comprises expanded PTFE.

Aspect 149 is an article as in any one of Aspects 146-148 and 150-152, wherein one or both of the first polymer layer and the second layer further comprises a fluoropolymer.

Aspect 150 is an article as in any one of Aspects 146-149 and 151-152, wherein the porous microstructure further comprises flattened nodes.

Aspect 151 is an article as in any one of Aspects 146-150 and 152, wherein the article further comprises a rough surface.

Aspect 152 is an article as any one of Aspects 146-151, wherein the article further comprises a three-dimensional bond interface.

Aspect 153 is an article comprising:

a first polymer layer comprising a surface; and a second layer comprising a surface adjacent to and bonded to the surface of the first polymer layer, wherein the article has a thickness of less than 15% of a thickness of the first polymer layer and the second layer prior to bonding.

Aspect 154 is an article as in any one of Aspects 153 and 155-159, wherein one or both of the first polymer layer and the second layer further comprises PTFE.

Aspect 155 is an article as in any one of Aspects 153-154 and 156-159, wherein one or both of the first polymer layer and the second layer further comprises expanded PTFE.

Aspect 156 is an article as in any one of Aspects 153-155 and 157-159, wherein one or both of the first polymer layer and the second layer further comprises a fluoropolymer.

Aspect 157 is an article as in any one of Aspects 153-156 and 158-159, wherein the first polymer layer further comprises fractured fibrils.

Aspect 158 is an article as in any one of Aspects 153-157 and 159, wherein the article further comprises a rough surface.

Aspect 159 is an article as any one of Aspects 153-158, wherein the article further comprises a three-dimensional bond interface.

Aspect 160 is an article comprising:

a first polymer layer comprising a first surface and a second surface, the first surface comprising a rough surface; and a second layer comprising a surface adjacent to and bonded to the second surface of the first polymer layer.

Aspect 161 is an article as in any one of Aspects 160 and 162-166, wherein the first polymer layer further comprises cellulose.

Aspect 162 is an article as in any one of Aspects 160-161 and 163-166, wherein the article further comprises a permeable fibrous substrate having a particle filtration efficiency.

Aspect 163 is an article as in any one of Aspects 160-162 and 164-166, wherein the article further comprises fractured fibers.

Aspect 164 is an article as in any one of Aspects 160-163 and 165-166, wherein the article further comprises a porous microstructure.

Aspect 165 is an article as in any one of Aspects 160-164 and 166, wherein the article further comprises fractured fibrils or flattened nodes.

Aspect 166 is an article as any one of Aspects 160-165, wherein the article further comprises a three-dimensional bond interface.

It should also be noted that, as used in this specification and the appended claims, the phrase "configured" describes a system, apparatus, or other structure that is constructed to perform a particular task or adopt a particular configuration. The word "configured" can be used interchangeably with similar words such as "arranged", "constructed", "manufactured", and the like.

All publications and patent applications in this specification are indicative of the level of ordinary skill in the art to which this technology pertains. All publications and patent applications are herein incorporated by reference to the same extent as if each individual publication or patent application was specifically and individually indicated by reference. In the event that any inconsistency exists between the disclosure of the present application and the disclosure(s) of any document incorporated herein by reference, the disclosure of the present application shall govern.

This application is intended to cover adaptations or variations of the present subject matter. It is to be understood that the above description is intended to be illustrative, and not restrictive, and the claims are not limited to the illustrative embodiments as set forth herein.

What is claimed is:

1. A method of manufacturing an article, the method comprising:

placing a compliant layer between a first pressing surface and a press;

placing a first polymer layer in contact with a second layer; and pressing the first polymer layer and the second layer between the first pressing surface and a second pressing surface to a pressure of at least 10,000 psi, thereby forming a bond between the first polymer layer and the second layer, wherein the article comprises flattened nodes and fractured fibrils.

2. The method as in claim 1, wherein the article comprises a permeable fibrous substrate having a particle filtration efficiency.

3. The method as in claim 1, wherein one or both of the first polymer layer and the second layer comprises PTFE.

4. The method as in claim 1, wherein the first pressing surface comprises a rough surface.

5. The method as in claim 1, further comprising placing a flexible backer layer between the first polymer layer and the first pressing surface or between the second layer and the second pressing surface.

6. The method as in claim 1, wherein the article comprises a rough surface.

7. The method as in claim 1, wherein the article comprises a three-dimensional bond interface.

8. The method as in claim 1, further comprising sintering the first polymer layer and the second layer to form a supplemental bond between the first polymer layer and the second layer.

9. An article comprising:

a first polymer layer comprising a surface and a porous microstructure, the porous microstructure comprising fractured fibrils and flattened nodes; and a second layer comprising a surface adjacent to and bonded to the surface of the first polymer layer.

10. The article as in claim 9, wherein one or both of the first polymer layer and the second layer further comprises PTFE.

11. The article as in claim 9, wherein the article further comprises a rough surface.

12. The article as in claim 9, wherein the article further comprises a three-dimensional bond interface.

13. An article comprising:

a first polymer layer comprising a first surface and a second surface, the first surface comprising a rough surface;

a second layer comprising a surface adjacent to and bonded to the second surface of the first polymer layer;

flattened nodes; and fractured fibrils, fractured fibers, or both fractured fibrils and fractured fibers.

14. The article as in claim 13, wherein the first polymer layer further comprises PTFE.

15. The article as in claim 13, wherein the article further comprises a permeable fibrous substrate having a particle filtration efficiency.

16. The article as in claim 13, wherein the article further comprises a three-dimensional bond interface.

* * * * *